United States Patent [19]

Wong et al.

[11] Patent Number: 4,930,101

[45] Date of Patent: May 29, 1990

[54] MICROPROCESSOR-CONTROLLED METER PACKAGE FOR A PRINTER

[75] Inventors: Yuen W. Wong, Glendale; Doina Mazilu, Woodland Hills; Paul O. Amdahl, Granada Hills, all of Calif.

[73] Assignee: Dataproducts Corporation, Woodland Hills, Calif.

[21] Appl. No.: 861,527

[22] Filed: May 9, 1986

[51] Int. Cl.[5] .................................................. G06F 9/00

[52] U.S. Cl. ........................................ 364/900; 400/53; 364/930; 364/930.7; 364/942.7

[58] Field of Search .................... 400/53; 364/200, 900

[56] References Cited

U.S. PATENT DOCUMENTS

| | | | |
|---|---|---|---|
| 3,763,474 | 10/1973 | Freeman et al. | 364/200 |
| 3,771,144 | 11/1973 | Belady et al. | 364/200 |
| 3,818,458 | 6/1974 | Deese | 364/200 |
| 4,070,702 | 1/1978 | Grants et al. | 364/200 |
| 4,369,493 | 1/1983 | Kronenberg | 364/200 |

*Primary Examiner*—Gareth D. Shaw
*Assistant Examiner*—John G. Mills
*Attorney, Agent, or Firm*—Spensley Horn Jubas & Lubitz

[57] ABSTRACT

In a line printer, an integrated meter package developing a clock incorporates a microprocessor receiving a line printed signal, power on voltage, and a preset ribbon exhaust count in order to compute in reference to the clock, and selectively display on an alphanumeric display panel, the total the lines printed, total on hours, total print hours, preset ribbon exhaust count, and number of print lines remaining until exhaustion of the ribbon. The microprocessor stores accumulated values to a non-volatile electrically programmable memory upon receipt of a power going down signal warning of incipient power off. The microprogrammed control is adaptable to maintain general maintenance and fault histories and periods.

30 Claims, 3 Drawing Sheets

| | 5 | 6 | 7 | 8 |
|---|---|---|---|---|
| 1 | X | MODE | RESET | X |
| 2 | X | HUNDRED | X | X |
| 3 | X | TEN | X | X |
| 4 | X | ONE | X | X |

MICROPROCESSOR-CONTROLLED METER PACKAGE FOR A PRINTER

BACKGROUND OF THE INVENTION

1. Field of the Invention

The present invention is generally concerned with electronically metering the histories and periods relevant to the maintenance and use of a printer. The present invention is specifically controlled using a microprocessor to receive certain signals, and to calculate and display certain quantities, particularly concerned with activities within a line printer.

2. Description of the Prior Art

Microprocessor-based control and maintenance panels, sometimes of great sophistication, are known for use with computers. However, metering, or conditions display for printers calls for the accumulation, and display, of certain types of information which are alien to computers.

One such condition which can be metered and displayed for a line printer is the total number of lines printed. In the prior art, such metering of total lines printed was accomplished by a mechanical or by an electrical-mechanical counter.

Another quantity which can be monitored for line printers is the remaining number of hours, or lines, within the life of a replaceable ribbon. This was also accomplished in the prior art by a mechanical or by an electrical-mechanical counter. Such electrical-mechanical counter could either be preset to a fixed number and count down, or, alternatively, could be preset to zero and count up. Both the counters for lines printed and for remaining lines of ribbon life tended to be bulky, expensive and failure prone.

Additionally, prior art printers normally employed an analog "mercury", thermometer-type, powered-on hours indicator. Such indicators are based on the migration of a visual indicator, nominally mercury, through a media during the presence of a potential difference across such media during periods of printer power on. Upon such elapsed hours as the migrating substance has completely crossed the media, the meter scale may be reversed, or the applied voltage may be reversed, and the entire process engaged in in the reverse direction. Unfortunately, the indication of elapsed hours obtained from such devices is extremely crude.

There is no evident attempt in the prior art to accumulate total print hours, possibly because of such crudity of elapsed time indicators. Consequent to the failure to determine total print hours, the duty cycle during which the printer is actually printing, as a fraction of the total hours during which the printer is powered on, has been indeterminable.

SUMMARY OF THE INVENTION

The present invention is a comprehensive, microprocessor-based, integrated meter package particularly for a line printer. The meter package will receive a line printed signal and power on voltage from the printer, and the user can manually enter a preset ribbon exhaust count. It internally produces a reference clock signal. The meter package computes therefrom, and selectively displays on an alphanumeric display panel, the (1) total lines printed, (2) total power-on hours, (3) total print hours, (4) ribbon exhaust preset, and (5) number of lines remaining in the current ribbon life. The meter package contains a microprocessor. Control of the microprocessor is by microcode, which is tailored in the preferred embodiment of the invention to a line printer but which is adaptable to diverse printer types. The microprogram approach offers improved English language prompts and output communication, better accuracy and resolution of quantities derived, and a cost reduction over prior art systems. It additionally offers the intrinsic display of new (the total print hours) and more accurate (the total power-on hours) information. Quantities hithertofore undeterminable such as the printer duty cycle (equalling the total print hours divided by the total power-on hours) are accurately determinable from the display output of the microprocessor-controlled meter package of the present invention.

In particular implementation, the present invention uses a microprocessor with both an integrated, on-board, random access memory (RAM) and read only memory (ROM), a 16-character alpha-numeric display, a non-volatile electrically erasable programmable read-only memory (EEPROM), and an 8-position membrane keypad. Multiple functions are accessible from the keypad, and data such as the ribbon life preset may be entered. The microprocessor uses its on-board random access memory (RAM) during power-on time for the storage of operands. The micro-instructions are non-volatilely stored in the on-board read only memory (ROM). When the printer's power supply is cut off, a rapidly dropping printer-developed signal is sensed by the microprocessor some milliseconds before the D.C. supply voltage used to power the meter logic becomes unusable. The microprocessor then preserves computed operands in the RAM memory to the EEPROM (which has a limited write cycle life). The contents of the EEPROM are reloaded to RAM on power-up, and the system is totally reactivated for accruing the metered quantities. Displayed resolution of all time quantities maintained is to the hour, and all counts maintained are precise.

Correspondingly, it is the object of the present invention to employ a microprocessor-based integrated meter package for the metering of certain quantities, and elapsed times, particularly pertinent to the operation of a printer.

DESCRIPTION OF THE PREFERRED EMBODIMENT

The present invention of a microprocessor-controlled meter package for a printer accumulates and displays certain status and use information involved with the activities of a line printer. In prior art printers, the total number of lines printed within a line printer, and the number of lines printed since the replacement of the ribbon (or, alternatively, the number of lines remaining in a preset ribbon count which is decremented with each line printed) were, insofar as such quantities were registered at all, maintained by mechanical or electrical-mechanical counters. The number of power-on hours (which will be maintained by the meter package of the present invention) was maintained in prior art printers by "thermometer-type" analog gauges reading, as a crude indication of elapsed time, the visual migration of a chemical indicia across a barrier of some width due to the presence during power on of a power voltage which induces migration of the indicia across the barrier. The physical displacement of the indicia within the barrier is a rough indication of elapsed power on time. By contrast, the present invention will maintain the total printer-on hours (HOURS ON) with high accuracy, and will additionally maintain the total number of hours during which the printer actually prints (PRINT HOURS). From these two quantities, the duty cycle of use of the printer can be derived as the total print hours divided by the total hours on.

Figure 1:
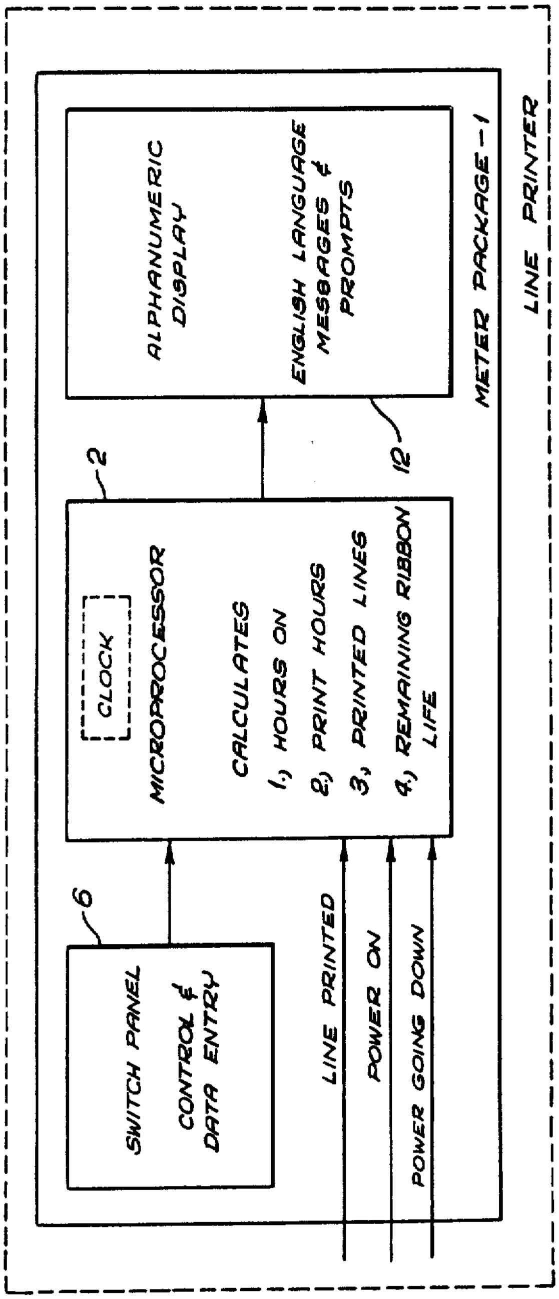
FIG. 1 shows a representational diagram of the location and function of the present invention of a microprocessor-controlled meter package for a printer.

A representational diagram of the present invention is shown in FIG. 1. An integrated METER PACKAGE 1 is completely contained within an otherwise conventional LINE PRINTER which is correspondingly illustrated in dashed line. A MICROPROCESSOR 2 is for receiving CONTROL AND DATA signals from a manual SWITCH PANEL 6, and signals indicating LINE PRINTED and POWER ON from the LINE PRINTER, plus a POWER GOING DOWN signal when the printer's power supply is cut off. A CLOCK signal is internally developed in METER PACKAGE 1, such as in the microprocessor. From these control, data, and input signals and by reference to the clock signal the MICROPROCESSOR 2 CALCULATES the counter variables (1) HOURS ON, (2) PRINT HOURS, (3) PRINTED LINES, and (4) REMAINING RIBBON LIFE. These quantities and others are displayed on an ALPHANUMERIC DISPLAY 12, in a prestored format which offers ENGLISH LANGUAGE MESSAGES & PROMPTS. The entire function is controlled by microcode.

Figure 2:
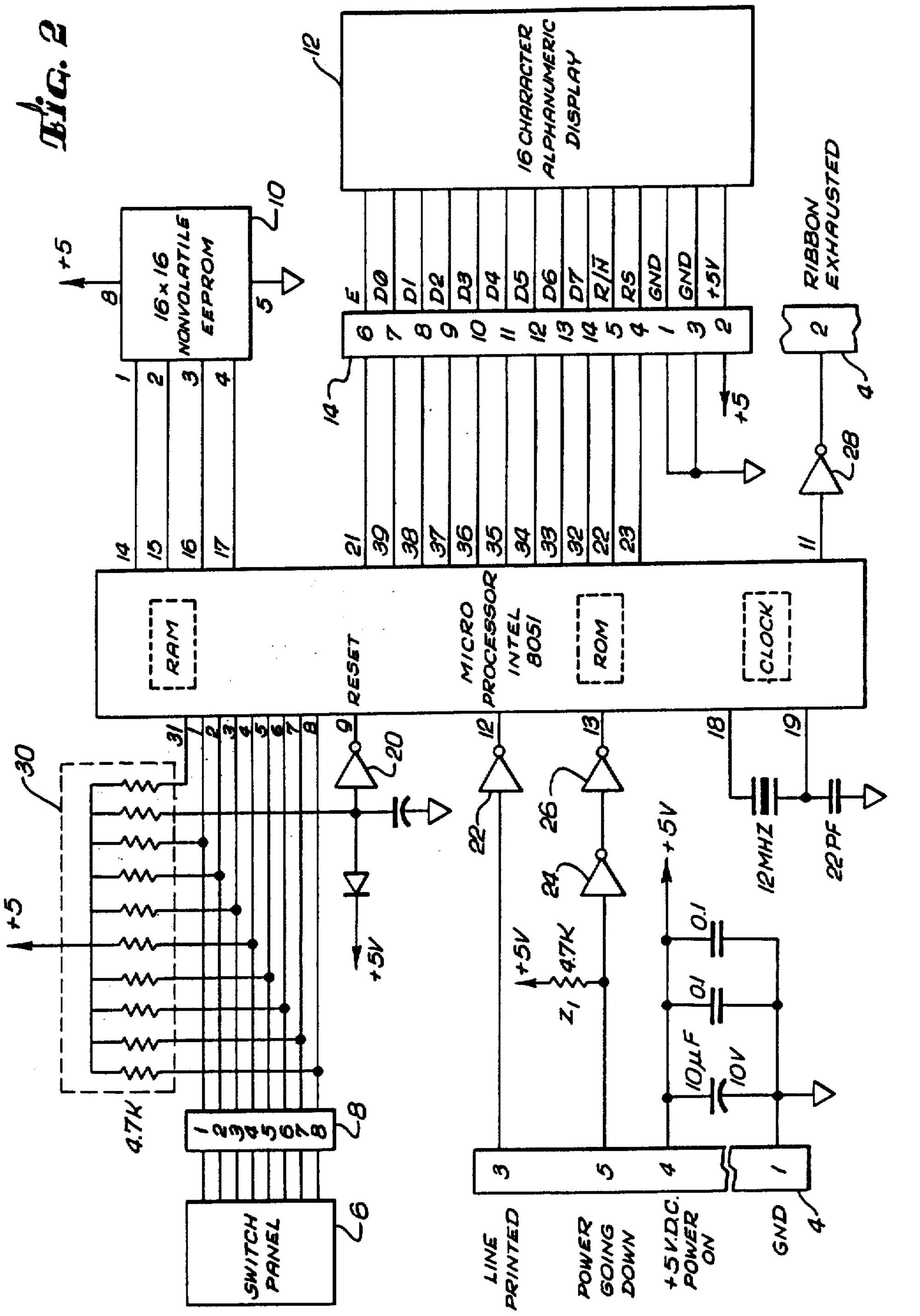
FIG. 2 shows a schematic block diagram of the microprocessor-controlled meter package for a printer of the present invention.

A schematic block diagram of the apparatus of the present invention is shown in FIG. 2. The MICROPROCESSOR 2 receives certain power, ground, and sensor signals via a plug 4 embedded in the printer. The MICROPROCESSOR 2 also receives input signals from an external SWITCH PANEL via a cable having a plug 8. The MICROPROCESSOR 2 engages in bidirectional communication for the reading and writing of data with a 16×16 NONVOLATILE EEPROM 10. To output the computed meter readings the MICROPROCESSOR 2 transmits the codes for 16 characters of corresponding alpha-numeric information for display on a 16 CHARACTER ALPHA-NUMERIC DISPLAY 12 connected by cable via a plug 14. Also upon its bussed communication channel, the MICROPROCESSOR 2 uses its on-board random access memory (RAM) for the storage of operands, such as the counter variables. The MICROPROCESSOR 2 uses its on-board read only memory (ROM) for the storage of microinstructions. Finally, the microprocessor produces a RIBBON EXHAUSTED signal which is communicated to an indicator within the printer via an alarm line connecting through a pin 2 of printer plug 4. Normally, the MICROPROCESSOR 2 and associated components illustrated inboard of plugs 4, 8, and 14 are entirely implemented upon a single printed circuit card.

Continuing in FIG. 2, the MICROPROCESSOR 2 is flexibly controlled by a microprogram prestored within its on-board read only memory (ROM). For nonvolatile storage of variables MICROPROCESSOR 2 also communicates with a second random access memory in the form of a 16×16 electrically erasable programmable memory, EEPROM 10. Compared to the RAM memory, this EEPROM has a limited write cycle life. After printer power is restored, the program contents within such memory are transferred back by the MICROPROCESSOR 2 to its on-board random access memory (RAM) and the operands stored in such random access memory (RAM) are used for the duration of the power-on condition. Responsive to an imminent power loss condition at the printer, a POWER GOING DOWN signal is received on plug 4, pin 5. The MICROPROCESSOR 2 will write the contents of its onboard random access memory (RAM), including all accumulated meter readings, to the 16×16 NONVOLATILE EEPROM 10. In particular, the total lines printed (in kilolines) and total hours on operand quantities will be stored. This activity upon the detection of an imminent power loss eliminates the need for battery backup of the on-board random access memory (RAM), for which the contents are volatile during power outage.

The function of MICROPROCESSOR 2 so executing such microprogram contained within the on-board read only memory (ROM) is to interpret user commands which are entered through manual SWITCH PANEL 6, to maintain certain accumulations of status and use conditions of the printer, and to display selected status or accumulated use totals as output alphanumeric displays on the 16 CHARACTER ALPHANUMERIC DISPLAY 12. In particular, the microprocessor-executed program will cause the panel display to automatedly scroll through the following messages designated A-E at approximately 2-second intervals:

A XXXXX HOURS ON
B XXXXX PRINT HRS
C XXXXX K LINES
D X X X X K LINES LEFT (or if the ribbon is exhausted then display: RIBBON EXHAUSTED)
E PRESET=X X X K (or if preset=0 then display: NO RIBBON PRESET)

A Mode switch (shown in FIG. 4) within the 8-position membrane keypad which serves as SWITCH PANEL 16 will, when pressed, cause the scrolling of the display to stop and will maintain the display of the current mode for 10 seconds. If the Mode switch is again depressed within the 10-second interval, then the next occurring status message will be displayed.

In all the messages A-E illustrated above, the character "X" is replaced with an appropriate actual digit. Message A is the microprocessor-calculated number of power on hours, which is derived from maintaining an HOURS ON counter variable responsive to a 12 megahertz internal clock signal shown in FIG. 2 to be regulated by a 12 MHz crystal connected at pins 18 and 19.

Appendix A is an assembly program that includes steps enabling an Intel 8051 microprocessor to calculate HOURS ON using an onboard timer (TIMER1) driven by the microprocessor's clock pulses. A SET_TIMER1 routine (lines 910-16) set TIMER 1 to interrupt the microprocessor every 50 ms as long as the POWER ON signal is high. In a corresponding TIMER1_INT interrupt handler, twenty such interrupts decrement a SECOND COUNTER (lines 160, 862-876), and sixty decrements of SECOND decrement a MINUTE counter (lines 162, 876-79). Sixty decrements of MINUTE increment (lines 879-884) a two byte hours counter (HOUR _2, HOUR_1) that holds the HOURS ON value.

Message B is the microprocessor-calculated number of PRINT HOURS which is derived by updating a PRINT HOURS counter variable from the clock only during periods when the LINE PRINTED signal has changed level (meaning a line has been printed) within a suitably preselected proximate time interval, nominally 1 second. The assembly program of Appendix A also uses the TIMER1_INT interrupt handler to calculate PRINT HOURS. Each time the SECOND counter is decremented, a P_SECOND counter ("line printed" seconds) is also afterwards decremented (line 888), *provided a PRINT FLAG bit is set* (*line* 886). Sixty decrements of P_SECOND decrement a P_MINUTE counter, and sixty decrements of P_MINUTE increment a PRINT HOURS counter (PHOUR132, PHOUR_1) (lines 888-896). The PRINT_FLAG bit is set at line 921 by a LINE_COUNT routine (lines 917-972) each time a line is printed, but is then cleared within a second by line 887 of the TIMER1_INT handler. Therefore, the PRINT-FLAG remains cleared during periods when the LINE PRINTED signal has not gone high for one second or more, and such nonprinting periods do not contribute to incrementing the PRINT HOURS counter variable. It should be recognized that a 600 lines-per-minute (600 lpm) printer prints a line every 100 milliseconds and a 900 lpm printer prints a line approximately every 66.7 milliseconds.

Message C represents the number of lines printed, in thousands, and is derived by the microprocessor directly from counting (as a lines counter variable) the level changes (in thousands) of a line printer signal shown in FIG. 1.

As an example of keypad or SWITCH PANEL 6 communication with the MICROPROCESSOR 2, a preset in kilolines of the expected ribbon life may be entered. Such ribbon preset can only be entered when the mode is selected by the Mode switch to the message E, "PRESET=XXX K". When this ribbon preset mode is entered, additional switches 1, 10, and 100 in a membrane switch panel area called RIBBON EXHAUST PRESET (shown in FIG. 4) can be used to increment the present value accordingly. For example, if the display shows "PRESET=123 K", then pressing the ones switch one time will cause the display to change to "PRESET=124 K". Correspondingly, pressing the TENS switch one time will cause the display to further change to "PRESET=134 K".

Further to the interaction with the microcoded control of the ribbon preset, reset of the ribbon exhausted condition, which results in a RIBBON EXHAUSTED signal on plug 4, pin 2 shown in FIG. 2, will only be recognized when in the mode displaying the message D "X X X K LINES LEFT", or displaying the message "RIBBON EXHAUSTED". When in such a mode displaying either of the messages D, pressing the RESET switch (shown in FIG. 4) will load the ribbon preset value into the LINES LEFT value maintained for the ribbon by the microprocessor. Additionally, when the display shows the message "RIBBON EXHAUSTED", then depressing the RESET switch (shown in FIG. 4) will additionally clear the ribbon exhausted fault as well as load the ribbon preset value into the LINES LEFT value maintained by the microprocessor. The particularities of switch control communication with the microprocessor, and the messages resultant thereby such communication, are not of any particular nor fundamental importance to the present invention, the pertinent concept being only that the microprocessor is controllable for accepting certain data and commands and for making display of data maintained therein responsive to such commands.

Continuing in FIG. 2, the preferred embodiment components for the implementation of the structures shown therein include an 8-position membrane keypad in implementation of SWITCH PANEL 6. The pull-up resistors of values 4.7 K ohms for pulling up the voltage level on HIGH signals received at MICROPROCESSOR 2 from SWITCH PANEL 6 are normally contained within a unitary package 30. The MICROPROCESSOR 2 is nominally of type Intel 8051. It contains both an on-board random access memory (RAM) and a read-only memory (ROM). The 16×16 NONVOLATILE EEPROM is nominally of type MNC 9306. The inverters 20, 22, 24, 26, and 28 shown in FIG. 1 are type 74LS14. Additional diodes, capacitors, resistors, and a clock crystal of frequency 12 megahertz for the microprocessor are of values as labelled.

Figure 3:
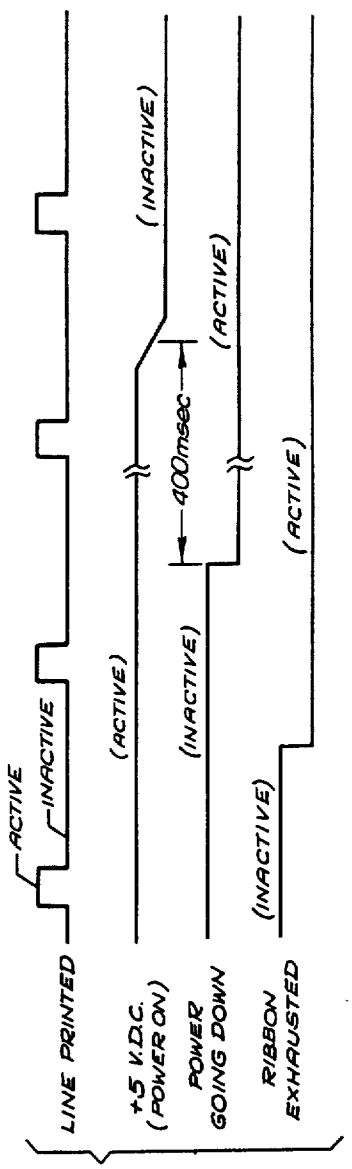
FIG. 3 shows a timing diagram of certain signals of the printer which are communicated to and from the circuit of the present invention shown in FIG. 2.

Referencing FIG. 3, the LINE PRINTED signal previously observed in FIG. 2 to be received through plug 4 pin 3, and inverter 22 into pin 12 of the MICROPROCESSOR 2, goes high upon the printing of each line. Such signal will be at a periodicity of 100 milliseconds in a 600-lines-per-minute printer, or at a periodicity of approximately 66.7 milliseconds in a 900-lines-per-minute printer. Such signal is readily derivable from the control section of any line printer.

Not intended to be related to the time scale shown for the LINE PRINTED signal, the POWER GOING DOWN signal shown in FIG. 3 was that printer-derived signal previously seen in FIGS. 1 and 2 which will occur upon the interruption of printer power at a short interval prior to the decay of the +5 V.D.C. system power to an unusable level. This interval is illustrated in FIG. 3 to be typically greater than 400 msec. Finally, the RIBBON EXHAUSTED signal previously seen in FIG. 2 is an output signal from the microprocessor, high when the ribbon is not exhausted and low when the ribbon exhaust preset line capacity has been exceeded during successive printing of lines.

Figures 4, 5:
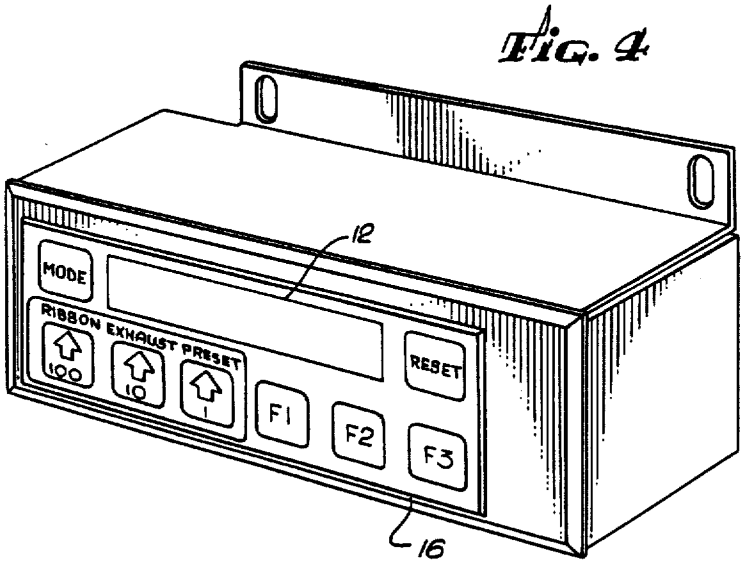
FIG. 4 shows a pictorial representation of the 16-character alpha-numeric display and membrane keypad switch panel, both previously seen in FIG. 2, of the present invention.
FIG. 5 shows a matrix indicating how actuation of those membrane switches, shown in the pictorial representation of the display of FIG. 4, translate into control signals received at the microprocessor previously seen in FIG. 2.

A diagrammatic representation of a suggested implementation and layout of the SWITCH PANEL 16, implemented as an 8-position membrane switch, is shown in FIG. 4. Additionally appearing is the display area of the 16 CHARACTER ALPHANUMERIC DISPLAY 12, which is nominally a Hitachi type LM020 LCD display. All membrane switches labelled Mode, Reset, F1, F2, F3, 100, 10 and 1 are used to produce signals sent to MICROPROCESSOR 2. The eight bit manner of encoding such switches for the setting of the low conditions of signal lines bits 1 through 8 is shown in FIG. 5. Such encoding, which is arbitrary, is usable in reference to interpreting the appended microcoded program used in control of the present invention.

An annotated assembly language source program for control of an Intel 8051 microprocessor in order to implement a meter package for a printer is contained in Appendix A to the present specification disclosure. Such program for an Intel 8000 family microprocessor is readily interpretable. For example, referring to Appendix A, to count the number of lines printed, program lines 103–104 instruct the 8051 microprocessor to jump to a LINE_COUNT interrupt routine (lines 917–972) each time the LINE PRINTED signal input via inverter 22 to microprocessor pin 12 goes high. The LINE_COUNT routine sets a PRINT FLAG bit (line 921) each time it is called. For each thousand times it is called, the LINE_COUNT routine also increments (lines 934–40) a three byte "kilolines printed" counter variable (LINE_3, LINE_2, LINE_1) and decrements (lines 944–49) a two byte "remaining ribbon life in kilolines" counter variable (REMAIN_2, REMAIN_1).

The program allows flexibility of the microprocessor-controlled meter package and enables display of customized alphanumeric messages. As was observed in FIG. 4, currently unused function keys F1, F2, and F3 allow implementation of specific customer requirements or future enhancements. Possible enhancements to the functions performed by the present invention include (1) the calculation of the printer duty cycle as the PRINT HOURS time divided by the total printer HOURS ON time, (2) the remaining hours until a service call is required, (3) the number of printer faults, and/or (4) the number of printer faults causing or requiring power down. Exclusive of such flexible future implementation, it will be recognized that the present approach offers more information, English language messages and prompts, better accuracy, and cost reduction over prior art methods of displaying status within, and cumulative operations of, a line printer. Consequent to such flexible and efficient application in serving as the meter package for a printer, the present invention should be interpreted by those claims which follow, only, and not by the specific preferred embodiment, either hardware or software, within which such invention is taught.

TABLE OF CONTENTS

METER PACKAGE ASSEMBLY
LANGUAGE SOURCE PROGRAM
INTEL MCS-51 MACROASSEMBLER V1.0

| LINES | DESCRIPTION |
|---|---|
| 013–091 | EQUATE TABLE (ADDRESSES OF VARIABLES) |
| 092–823 | MAIN PROGRAM |
| 092–117 | INTERRUPT VECTOR TABLE |
| 118–207 | INITIALIZE & RESTORE |
| 208–218 | DISPLAY NEXT MODE |
| 219–291 | SCAN & READ KEYPAD (Switch Panel) |
| SUBROUTINES: | |
| 292–440 | MODE HANDLERS |
| 441–695 | MODE DISPLAY |
| 696–725 | WRITE TO LCD DISPLAY |
| 726–823 | READ/WRITE EEPROM ROUTINE |
| 824–994 | INTERRUPT ROUTINES |
| 824–857 | DISPLAY FLASHER (TIMER 0 INTERRUPT) |
| 858–916 | 50 MS TIMER (TIMER 1 INTERRUPT) |
| 917–972 | LINE COUNTER (EXTERNAL INTERRUPT 0) |
| 973–994 | POWER DOWN HANDLER (EXTERNAL INTERRUPT 1) |
| PAGE 21 | CROSS REFERENCE TABLE |

```
ISIS-II MCS-51 MACRO ASSEMBLER V1.0
OBJECT MODULE PLACED IN :F1:METER.HEX
ASSEMBLER INVOKED BY:  ASM51 :F1:METER.SRC DATE(1-15-1986)

LOC  OBJ            LINE     SOURCE

                       1     $XREF
                       2     $TITLE(LB-SERIES METER PACKAGE PROGRAM)
                       3
                       4
                       5     ;**********************************************************************
                       6     ;                                                                     *
                       7     ;        METER.SRC                        MARK-X METER PACKAGE PROGRAM *
                       8     ;                                                                     *
                       9     ;**********************************************************************
                      10
                      11     ;        ENGINEERING VERSION
                      12
                      13     ;**********************************************************************
                      14     ;                                                                     *
                      15     ;        EQUATE TABLE                                                 *
                      16     ;                                                                     *
                      17     ;**********************************************************************
                      18
                      19
REG                   20             CONTACT_COUNT       EQU     R2          ;FOR KEY DEBOUNCE
REG                   21             TEMP                EQU     R3
                      22
00A5                  23             LCD_STROBE          EQU     0A5H        ;P2.5
                      24
00B1                  25             RIBBON_EXH          EQU     0B1H        ;P3.1
00B4                  26             EEPROM_SELECT       EQU     0B4H        ;P3.4
00B5                  27             EEPROM_STROBE       EQU     0B5H        ;P3.5
00B6                  28             FROM_EEPROM         EQU     0B6H        ;P3.6
00B6                  29             READ_WRITE          EQU     0B6H
00B7                  30             TO_EEPROM           EQU     0B7H        ;P3.7
00B7                  31             INST_DATA           EQU     0B7H
                      32
0030                  33             COLUMN_1            EQU     030H
0031                  34             COLUMN_2            EQU     031H
0032                  35             COLUMN_3            EQU     032H
0033                  36             COLUMN_4            EQU     033H
                      37
0034                  38             COLUMN_BUF          EQU     034H
0035                  39             ROW_BUF             EQU     035H
0036                  40             COLUMN_REG          EQU     036H
```

```
0037                    ROW_REG              EQU     037H
0038                    CLOSE_COUNTER        EQU     038H
0039                    OPEN_COUNTER         EQU     039H
003A                    INT_COUNTER          EQU     03AH
003B                    MSEC                 EQU     03BH
003C                    SECOND               EQU     03CH
003D                    MINUTE               EQU     03DH
003E                    P_SECOND             EQU     03EH
003F                    P_MINUTE             EQU     03FH

0040                    DISPLAY_MODE         EQU     040H
0041                    HOUR_1               EQU     041H
0042                    HOUR_2               EQU     042H
0043                    PHOUR_1              EQU     043H
0044                    PHOUR_2              EQU     044H
0045                    LINE_1               EQU     045H
0046                    LINE_2               EQU     046H
0047                    LINE_3               EQU     047H
0048                    SEC_COUNTER          EQU     048H
0049                    REMAIN_1             EQU     049H
004A                    REMAIN_2             EQU     04AH
004B                    PRESET_1             EQU     04BH
004C                    PRESET_2             EQU     04CH
004D                    EEPROM_BUF_1         EQU     04DH
004E                    EEPROM_BUF_2         EQU     04EH
004F                    EEPROM_COUNTER_1     EQU     04FH
0050                    EEPROM_COUNTER_2     EQU     050H
0051                    LO_BYTE              EQU     051H
0052                    MID_BYTE             EQU     052H
0053                    HI_BYTE              EQU     053H
0054                    EEPROM_ADD           EQU     054H

0055                    HUNDRED_BUF          EQU     055H
0056                    TEN_BUF              EQU     056H
0057                    ONE_BUF              EQU     057H
0058                    DISPLAY_COUNTER      EQU     058H
0059                    BYTE_1               EQU     059H
005A                    BYTE_2               EQU     05AH
005B                    BYTE_3               EQU     05BH
005C                    LINE_CTR1            EQU     05CH
005D                    LINE_CTR2            EQU     05DH
005E                    SHIFT_COUNTER        EQU     05EH


             ;          ALL LOCATIONS ABOVE 05F ARE RESERVED FOR STACK OPERATIONS
0000                    ZERO_FLAG            EQU     000H
0001                    GOOD_FLAG            EQU     001H
0002                    MODE_FLAG            EQU     002H
0003                    ON_FLAG              EQU     003H
0004                    PRESET_FLAG          EQU     004H
0005                    PRINT_FLAG           EQU     005H

             ;*******************************************************************
             ;                                                                  *
             ;                          MAIN PROGRAM                            *
             ;                                                                  *
             ;*******************************************************************


0000                    ORG     000H                    ;POWER UP RESET
0000 020050             LJMP    INIT

0003                    ORG     003H                    ;EXTERNAL INTERRUPT 0, LINE COUNTER
0003 020572             LJMP    LINE_COUNT

000B                    ORG     00BH                    ;TIMER-0 INTERRUPT, FLASHING DISAPLAY
000B 053A15             DJNZ    INT_COUNTER,I_RET
000E 0204EC             LJMP    TIMERO_INT
             ;
0013                    ORG     013H                    ;EXTERNAL INTERRUPT 1, POWER DOWN
0013 0205BF             LJMP    POWER_DOWN

001B                    ORG     01BH                    ;TIMER-1 INTERRUPT, 50 MSEC TIMER
001B 020514             LJMP    TIMER1_INT
             ;
0023                    ORG     023H                    ;SERIAL INTERRUPT, NOT USED
0023 32      I_RET:     RETI

             ;
             ;*******************************************************************
             ;
0050                    ORG 050H
             ;
0050 75815F  INIT:      MOV     SP,#5FH                 ;STACK STARTS AT 60H (32 BYTES)
0053 75A010             MOV     P2,#10H                 ;INITIALIZE PORT 2
0056 75B00F             MOV     P3,#0FH                 ;SET PORT-3
             ;
0059 752000             MOV     20,#00H                 ;CLEAR ALL FLAGS
             ;
005C 75540F             MOV     EEPROM_ADD,#00FH        ;CHECK IF FIRST TIME EVER START UP
005F 12048F             CALL    READ_EEPROM
0062 E54D               MOV     A,EEPROM_BUF_1
0064 6010               JZ      NOT_COLD
             ;
0066 7916               MOV     R1,#016H                ;WRITE ZEROS INTO ALL 16 WORDS
0068 E4                 CLR     A
0069 F554               MOV     EEPROM_ADD,A
006B F54D               MOV     EEPROM_BUF_1,A
006D F54E               MOV     EEPROM_BUF_2,A
             ;
```

```
                ERASE_MORE:
006F 120467             CALL    WRITE_EEPROM
0072 0554               INC     EEPROM_ADD
0074 D9F9               DJNZ    R1,ERASE_MORE
                ;
                NOT_COLD:
0076 7554FF             MOV     EEPROM_ADD,#0FFH        ;GET INFO OUT FROM EEPROM
0079 7941               MOV     R1,#HOUR_1
                MORE:
007B 0554               INC     EEPROM_ADD
007D 12048F             CALL    READ_EEPROM
0080 A74D               MOV     @R1,EEPROM_BUF_1
0082 09                 INC     R1
0083 A74E               MOV     @R1,EEPROM_BUF_2
0085 09                 INC     R1
0086 B940F2             CJNE    R1,#PRESET_2+1,MORE
                ;
0089 120212             CALL    CK_PRESET               ;SEE IF RIBBON EXH ENABLE
                ;
008C 753814             MOV     MSEC,#020D              ;SET INTERRUPT PARAMETERS
008F 75301E             MOV     MINUTE,#030D            ;FIRST 30 MINS COUNT AS ONE HOUR
0092 753C3C             MOV     SECOND,#060D
0095 753F1E             MOV     P_MINUTE,#030D
0098 753E3C             MOV     P_SECOND,#060D
                ;
009B 755CFA             MOV     LINE_CTR1,#0250D
009E 755D04             MOV     LINE_CTR2,#004D
                ;
00A1 D288               SETB    IT0                     ;POWER DOWN INT. IS EDGE TRIGGERED
00A3 D28A               SETB    IT1                     ;LINE COUNT INT. IS EDGE TRIGGERED
00A5 75B804             MOV     IP,#004                 ;SET PRIORITY FOR POWER DOWN INT
00A8 75A889             MOV     IE,#089H                ;ENABLE TIMER1,EXT-0, INTERRUPTS
00AB 758911             MOV     TMOD,#11H               ;SET UP 16-BIT TIMERS
                
00AE 120567             CALL    SET_TIMER1              ;START TIMER1
                ;
00B1 120463             CALL    CLEAR_LCD               ;CLEAR DISPLAY
00B4 7438               MOV     A,#38H                  ;SET LCD FOR 8-BIT,5X7 MATRIX,
00B6 120442             CALL    SEND_COMMAND            ;AND 2-LINE DISPLAY
00B9 740C               MOV     A,#0CH                  ;SET DISPLAY ON,CURSOR OFF,NO BLINK
00BB 120442             CALL    SEND_COMMAND
                
00BE 854851             MOV     LO_BYTE,PRESET_1        ;RESTORE PRESET COUNTER BUFFERS
00C1 854C52             MOV     MID_BYTE,PRESET_2
00C4 755300             MOV     HI_BYTE,#00H
                ;
00C7 120368             CALL    BINARY_DECIMAL
                ;
00CA E559               MOV     A,BYTE_1
00CC 540F               ANL     A,#00FH
00CE F557               MOV     ONE_BUF,A
                ;
00D0 E559               MOV     A,BYTE_1
00D2 54F0               ANL     A,#0F0H
00D4 C4                 SWAP    A
00D5 F556               MOV     TEN_BUF,A
                ;
00D7 E55A               MOV     A,BYTE_2
00D9 540F               ANL     A,#00FH
00DB F555               MOV     HUNDRED_BUF,A
                ;
00DD 7530EF             MOV     COLUMN_1,#0EFH          ;COLUMN 1
00E0 7531DF             MOV     COLUMN_2,#0DFH          ;COLUMN 2
00E3 7532BF             MOV     COLUMN_3,#0BFH          ;COLUMN 3
00E6 75337F             MOV     COLUMN_4,#07FH          ;COLUMN 4
                
00E9 7540FF             MOV     DISPLAY_MODE,#0FFH
                ;
                NEXT_MODE:
00EC C202               CLR     MODE_FLAG
00EE 120191             CALL    INC_MODE
00F1 12025C             CALL    MODE_DISPLAY
00F4 754802             MOV     SEC_COUNTER,#02H        ;DISPLAY CURRENT MODE FOR 2 SECS
                ;
                INIT2:
00F7 308104             JNB     RIBBON_EXH,FAULT
00FA E548               MOV     A,SEC_COUNTER           ;TIME FOR NEXT MODE?
00FC 60EE               JZ      NEXT_MODE
                ;
00FE 753832     FAULT:  MOV     CLOSE_COUNTER,#50
0101 753732             MOV     OPEN_COUNTER,#50
0104 C201               CLR     GOOD_FLAG
                
                
0106 3118       KEY:    ACALL   SCANKEY                 ;SCAN THE KEYPAD
0108 BA0102             CJNE    CONTACT_COUNT,#01,$+5
010B 2137               AJMP    CONTACT                 ;SINGLE CONTACT DETECTED
010D BA00E7             CJNE    CONTACT_COUNT,#00,INIT2 ;IF NOT 0 THEN MULTIPLE CONTACT
0110 3001E4             JNB     GOOD_FLAG,INIT2         ;NO CONTACT, KEEP LOOKING
0113 D539F0             DJNZ    OPEN_COUNTER,KEY        ;KEY RELEASED LONG ENOUGH?
0116 214E               AJMP    CLO                     ;GOOD CONTACT
                
                SCANKEY:
0118 7A00               MOV     CONTACT_COUNT,#00
011A 7830               MOV     R0,#COLUMN_1            ;INITIALIZE COLUMN COUNTER
                
011C 7900       NXTCOL: MOV     R1,#00                  ;INITIALIZE ROW COUNTER
011E 8690               MOV     P1,@R0                  ;STROBE KEYPAD
```

```
0120 00                  NOP
0121 E590                MOV     A,P1                   ;READ KEYPAD DATA

0123 30E00A   NXTROW:    JNB     ACC.0,KEYIN            ;JUMP IF KEY CLOSURE DETECTED
0126 03       CONTIN:    RR      A                      ;ROTATE NEXT ROW BIT FOR TEST
0127 09                  INC     R1                     ;INCREMENT ROW COUNTER
0128 B904F8              CJNE    R1,#04,NXTROW          ;CHECK IF ALL ROWS TESTED
012B 08                  INC     R0                     ;INCREMENT COLUMN COUNTER
012C B834E0              CJNE    R0,#34H,NXTCOL         ;CHECK IF ALL COLUMNS TESTED
012F 22                  RET

0130 8834     KEYIN:     MOV     COLUMN_BUF,R0          ;SAVE COLUMN OF KEY
0132 8935                MOV     ROW_BUF,R1             ;SAVE ROW OF KEY
0134 0A                  INC     CONTACT_COUNT
0135 2126                AJMP    CONTIN                 ;CONTINUE LOOKING FOR CLOSURES

              CONTACT:
0137 E534                MOV     A,COLUMN_BUF
0139 B5360A              CJNE    A,COLUMN_REG,DIFFER    ;CK IF THE SAME SWITCH
013C E535                MOV     A,ROW_BUF
013E B53705              CJNE    A,ROW_REG,DIFFER
0141 D538C2              DJNZ    CLOSE_COUNTER,KEY      ;KEY PRESSED LONG ENOUGH?
0144 D201                SETB    GOOD_FLAG              ;VALID KEY CLOSURE

0146 853436   DIFFER:    MOV     COLUMN_REG,COLUMN_BUF  ;GET NEW SWITCH
0149 853537              MOV     ROW_REG,ROW_BUF
014C 2106                AJMP    KEY

014E E537     CLO:       MOV     A,ROW_REG              ;GET ROW LOCATION
0150 23                  RL      A                      ;A=A*4
0151 23                  RL      A
0152 53340F              ANL     COLUMN_BUF,#0FH        ;MASK OFF THE HI-NIBBLE
0155 2534                ADD     A,COLUMN_BUF
0157 23                  RL      A                      ;ADJUSTMENT FOR THE JUMP TABLE
0158 90015C              MOV     DPTR,#TABLE
015B 73                  JMP     @A+DPTR

015C 01F7     TABLE:     AJMP    INIT2
015E 217C                AJMP    MODE
0160 219C                AJMP    CLEAR
0162 01F7                AJMP    INIT2
0164 01F7                AJMP    INIT2
0166 2106                AJMP    HUNDRED
0168 01F7                AJMP    INIT2
016A 01F7                AJMP    INIT2
016C 01F7                AJMP    INIT2
016E 21E0                AJMP    TEN
0170 01F7                AJMP    INIT2
0172 01F7                AJMP    INIT2
0174 01F7                AJMP    INIT2
0176 411F                AJMP    ONE
0178 01F7                AJMP    INIT2
017A 01F7                AJMP    INIT2

              ;*******************************************************************
              ;
              MODE:
017C 309105              JNB     RIBBON_EXH,MODE_RET
017F 200207              JB      MODE_FLAG,MODE_1       ;JUMP IF ALREADY IN THIS MODE
0182 D202                SETB    MODE_FLAG
              MODE_RET:
0184 75480A              MOV     SEC_COUNTER,#100       ;SET TIMER TO STAY IN THIS MODE
0187 01F7                JMP     INIT2                  ;FOR 10 SECS
              ;
              MODE_1:
0189 120191              CALL    INC_MODE               ;GO TO NEXT MODE
018C 12025C              CALL    MODE_DISPLAY
018F 2184                AJMP    MODE_RET
              ;
              ;
              INC_MODE:
0191 0540                INC     DISPLAY_MODE           ;GOTO NEXT MODE
0193 E540                MOV     A,DISPLAY_MODE
0195 B40503              CJNE    A,#005H,INC_RET
0198 754000              MOV     DISPLAY_MODE,#00H
              ;
              INC_RET:
019B 22                  RET
              ;
              ;
              CLEAR:
019C 308118              JNB     RIBBON_EXH,CLEAR_2     ;JUMP IF IN EXHAUSTED MODE
019F 200202              JB      MODE_FLAG,CLEAR_1      ;JUMP IF IN DISPLAY MODE ELSE RETURN
              CLEAR_RET:
01A2 01F7                JMP     INIT2
              ;
              CLEAR_1:
01A4 E540                MOV     A,DISPLAY_MODE         ;RETURN IF NOT IN CLEAR MODE
01A6 B403F9              CJNE    A,#003H,CLEAR_RET
              ;
01A9 854B49              MOV     REMAIN_1,PRESET_1      ;RESET REMAIN COUNTERS
01AC 854C4A              MOV     REMAIN_2,PRESET_2
              ;
01AF 1202F0              CALL    SEND_CONDITION         ;UPDATE DISPLAY
01B2 75480A              MOV     SEC_COUNTER,#0100
01B5 21A2                AJMP    CLEAR_RET
              ;
              CLEAR_2:
```

```
0187 C2A9              CLR     ET0                      ;DISPLAY INTERRUPT AND TIMER0
01B9 C28C              CLR     TR0
               ;
01BB 854B49            MOV     REMAIN_1,PRESET_1
01BE 854C4A            MOV     REMAIN_2,PRESET_2
               ;
01C1 200305            JB      ON_FLAG,ALREADY_ON       ;TURN DISPLAY BACK ON IF OFF
01C4 740C              MOV     A,#00CH
01C6 120442            CALL    SEND_COMMAND
               ALREADY_ON:
01C9 754003            MOV     DISPLAY_MODE,#003H
01CC 12025C            CALL    MODE_DISPLAY
01CF D281              SETB    RIBBON_EXH
01D1 75480A            MOV     SEC_COUNTER,#010D
01D4 01F7              AJMP    INIT2
               ;
               ;
               HUNDRED:
01D6 30811A            JNB     RIBBON_EXH,TEN_RET
01D9 300217            JNB     MODE_FLAG,TEN_RET        ;RETURN IF NOT IN DISPLAY MODE
               ;
01DC E540              MOV     A,DISPLAY_MODE           ;RETURN IF NOT IN PRESET MODE
01DE B40412            CJNE    A,#004H,TEN_RET
               ;
01E1 0555              INC     HUNDRED_BUF
01E3 E555              MOV     A,HUNDRED_BUF
01E5 B4041C            CJNE    A,#010D,TEN_1
01E8 755500            MOV     HUNDRED_BUF,#00H
               ;
01EB 4104              AJMP    TEN_1
               ;
               ;
               TEN:
01ED 308103            JNB     RIBBON_EXH,TEN_RET
01F0 200202            JB      MODE_FLAG,TEN_2
               TEN_RET:
01F3 01F7              JMP     INIT2
               ;
               TEN_2:
01F5 E540              MOV     A,DISPLAY_MODE
01F7 B404F9            CJNE    A,#004H,TEN_RET
               ;
01FA 0556              INC     TEN_BUF
01FC E556              MOV     A,TEN_BUF
01FE B40A03            CJNE    A,#010D,TEN_1
0201 755500            MOV     TEN_BUF,#00H
               ;
               TEN_1:
0204 120236            CALL    DECIMAL_BINARY           ;CONVERT TO BINARY
0207 1202FD            CALL    SEND_CONDITION
020A 120212            CALL    CK_PRESET                ;CK IF PRESET = 0
020D 75480A            MOV     SEC_COUNTER,#010D
0210 01F7              JMP     INIT2
               ;
               CK_PRESET:
0212 C204              CLR     PRESET_FLAG
0214 E54B              MOV     A,PRESET_1
0216 7006              JNZ     CK_RET
0218 E54C              MOV     A,PRESET_2
021A 7002              JNZ     CK_RET
021C D204              SETB    PRESET_FLAG              ;IF PRESET=0 THEN SET FLAG
               CK_RET:
021E 22                RET
               ;
               ;
               ONE:
021F 3081D1            JNB     RIBBON_EXH,TEN_RET
0222 3002CE            JNB     MODE_FLAG,TEN_RET
               ;
0225 E540              MOV     A,DISPLAY_MODE
0227 B404C9            CJNE    A,#004H,TEN_RET
               ;
022A 0557              INC     ONE_BUF
022C E557              MOV     A,ONE_BUF
022E B40AD3            CJNE    A,#010D,TEN_1
0231 755700            MOV     ONE_BUF,#00H
0234 4104              AJMP    TEN_1
               ;
               ;
               DECIMAL_BINARY:
0236 E555              MOV     A,HUNDRED_BUF            ;PRESET_1,PRESET_2=HUNDRED_BUF X 100
0238 75F064            MOV     B,#0100D
023B A4                MUL     AB
023C F54B              MOV     PRESET_1,A
023E 85F04C            MOV     PRESET_2,B
               ;
0241 E556              MOV     A,TEN_BUF                ;PRESET_1,PRESET_2=PRESET_1,PRESET_2 +
0243 75F00A            MOV     B,#010D                  ;(TEN_BUF X 10)
0246 A4                MUL     AB
0247 254B              ADD     A,PRESET_1
0249 F54B              MOV     PRESET_1,A
               ;
024B E5F0              MOV     A,B
024D 354C              ADDC    A,PRESET_2
024F F54C              MOV     PRESET_2,A
               ;
0251 E54B              MOV     A,PRESET_1               ;PRESET_1,PRESET_2=PRESET_1,PRESET_2 +
0253 2557              ADD     A,ONE_BUF                ;ONE_BUF
0255 F54B              MOV     PRESET_1,A
```

```
0257 5002                     JNC     D3_RET
0259 054C                     INC     PRESET_2
                  ;
                  D3_RET:
025B 22                       RET

                  ;********************************************************************
                  MODE_DISPLAY:
025C 120463                   CALL    CLEAR_LCD
                  ;
025F E540                     MOV     A,DISPLAY_MODE
0261 B40305                   CJNE    A,#003H,NOT_2            ;MODE 3 ?
0264 300402                   JNB     PRESET_FLAG,NOT_2        ;IF PRESET = 0 THEN DISPLAY NO PRESET
0267 7406                     MOV     A,#006H
                  ;
                  NOT_2:
0269 75F010                   MOV     B,#16                    ;MUTIPLY MESSAGE NUMBER BY 16
026C A4                       MUL     AB                       ;  TO GET THE OFFSET
026D 90028D                   MOV     DPTR,#MESSAGE            ;GET START ADDR FOR MSG TABLE
0270 2582                     ADD     A,DPL                    ;ADD OFFSET
0272 F582                     MOV     DPL,A
0274 E5F0                     MOV     A,B
0276 3583                     ADDC    A,DPH
0278 F583                     MOV     DPH,A
027A 7800                     MOV     TEMP,#00

                  NEXT_CHAR:
027C E8                       MOV     A,TEMP
027D 93                       MOVC    A,@A+DPTR                ;GET NEXT CHARACTER

027E 9146                     ACALL   SEND_DATA                ;SEND CHARACTER TO LCD
0280 08                       INC     TEMP
0281 B80804                   CJNE    TEMP,#08,CHK16
0284 74C0                     MOV     A,#0C0H                  ;GO TO SECOND LINE OF DISPLAY
0286 9142                     ACALL   SEND_COMMAND

0288 B810F1       CHK16:      CJNE    TEMP,#16,NEXT_CHAR       ;CHECK IF ALL 16 CHARACTERS SENT
028B 41FD                     AJMP    SEND_CONDITION

                  MESSAGE:
028D 20202020                 DB      '       HOURS ON '
0291 20202048
0295 4F555253
0299 204F4E20
                  ;
029D 20202020                 DB      '       PRINT HRS'
02A1 20202050
02A5 52494E54
02A9 20485253
                  ;
02AD 20202020                 DB      '       K LINES  '
02B1 20202048
02B5 204C494E
02B9 45532020
                  ;
02BD 20202020                 DB      '    K LINES LEFT'
02C1 4B204C49
02C5 4E455320
02C9 4C454654
                  ;
02CD 20505245                 DB      ' PRESET =     K '
02D1 53455420
02D5 3D202020
02D9 20204B20
                  ;
02DD 52494242                 DB      'RIBBON EXHAUSTED'
02E1 4F4E2045
02E5 58484155
02E9 53544544
                  ;
02ED 4E4F2052                 DB      'NO RIBBON PRESET'
02F1 4942424F
02F5 4E205052
02F9 45534554
                  ;
                  ;
                  SEND_CONDITION:
02FD E540                     MOV     A,DISPLAY_MODE           ;CK FLAG IF IN MODE 3
02FF B40304                   CJNE    A,#003H,SC_1             ;NO CONDITION DISPLAY IF FLAG IS SET
0302 300401                   JNB     PRESET_FLAG,SC_1
0305 22                       RET
                  SC_1:
0306 E540                     MOV     A,DISPLAY_MODE           ;IF IN PRESET MODE
0308 B40404                   CJNE    A,#04H,HOME              ; THEN MOVE CURSOR TO POSITIN 12
030B 74C2                     MOV     A,#0C2H                  ; ELSE MOVE CURSOR HOME
030D 6111                     AJMP    $+4
030F 7402         HOME:       MOV     A,#02H
0311 120442                   CALL    SEND_COMMAND

0314 E540                     MOV     A,DISPLAY_MODE
0316 75F003                   MOV     B,#03H
0319 A4                       MUL     AB
031A 90031E                   MOV     DPTR,#MODE_TABLE
031D 73                       JMP     @A+DPTR
                  ;
                  MODE_TABLE:
031E 020330                   LJMP    HOUR
0321 020335                   LJMP    PRHOUR
```

```
0324 020346          LJMP    LINE
0327 020351          LJMP    REMAIN
032A 02035C          LJMP    PRESET
032D 020425          LJMP    EXHAUSTED
              ;
              HOUR:
0330 854151          MOV     LO_BYTE,HOUR_1
0333 854252          MOV     MID_BYTE,HOUR_2
0336 755300          MOV     HI_BYTE,#00H
0339 6165            AJMP    GO_DISPLAY
              ;
              PRHOUR:
033B 854351          MOV     LO_BYTE,PHOUR_1
033E 854452          MOV     MID_BYTE,PHOUR_2
0341 755300          MOV     HI_BYTE,#00H
0344 6165            AJMP    GO_DISPLAY
              ;
              LINE:
0346 854551          MOV     LO_BYTE,LINE_1
0349 854652          MOV     MID_BYTE,LINE_2
034C 854753          MOV     HI_BYTE,LINE_3
034F 6165            AJMP    GO_DISPLAY
              ;
              REMAIN:
0351 854951          MOV     LO_BYTE,REMAIN_1
0354 854A52          MOV     MID_BYTE,REMAIN_2
0357 755300          MOV     HI_BYTE,#00H
035A 6165            AJMP    GO_DISPLAY
              ;
              PRESET:
035C 854851          MOV     LO_BYTE,PRESET_1
035F 854C52          MOV     MID_BYTE,PRESET_2
0362 755300          MOV     HI_BYTE,#00H
              ;
              GO_DISPLAY:
0365 12036B          CALL    BINARY_DECIMAL
0368 020308          JMP     DISPLAY_CONDITION
              ;
              ;
              BINARY_DECIMAL:
036B 755E14          MOV     SHIFT_COUNTER,#0200      ;SET FOR 19 TIMES
036E E4              CLR     A
036F F559            MOV     BYTE_1,A                 ;CLEAR RESULT REGS
0371 F55A            MOV     BYTE_2,A
0373 F55B            MOV     BYTE_3,A
0375 9003A2          MOV     DPTR,#DECIMAL_TABLE      ;GET STARTING ADDRESS OF TABLE
              ;
              CHECK_MORE:
0378 D55E01          DJNZ    SHIFT_COUNTER,SHIFT_MORE
037B 22              RET
              ;
              SHIFT_MORE:
037C C3              CLR     C
037D E553            MOV     A,HI_BYTE
037F 13              RRC     A
0380 F553            MOV     HI_BYTE,A
              ;
0382 E552            MOV     A,MID_BYTE
0384 13              RRC     A
0385 F552            MOV     MID_BYTE,A
              ;
0387 E551            MOV     A,LO_BYTE
0389 13              RRC     A
038A F551            MOV     LO_BYTE,A
              ;
039C 4005            JC      ADDITION                 ;GO ADD TABLE VALUE
              ;
038E A3              INC     DPTR                     ;SET POINTER TO NEXT VALUE
039F A3              INC     DPTR
0390 A3              INC     DPTR
0391 6178            AJMP    CHECK_MORE
              ;
              ADDITION:
0393 C3              CLR     C

0394 7859            MOV     R0,#BYTE_1               ;SET POINTER
              ;
              NEXT_VALUE:
0396 E4              CLR     A
0397 93              MOVC    A,@A+DPTR                ;GET TABLE VALUE
0398 36              ADDC    A,@R0                    ;ADD VALUE ALREADY IN REG
0399 D4              DA      A                        ;DECIMAL ADJUST
039A F6              MOV     @R0,A
039B A3              INC     DPTR
039C 08              INC     R0                       ;INC POINTER
039D B85CF6          CJNE    R0,#BYTE_3+1,NEXT_VALUE  ;DONE?
03A0 6178            AJMP    CHECK_MORE
              ;
              DECIMAL_TABLE:
03A2 01              DB      01H,00H,00H
03A3 00
03A4 00
03A5 02              DB      02H,00H,00H
03A6 00
03A7 00
03A8 04              DB      04H,00H,00H
03A9 00
03AA 00
03AB 08              DB      08H,00H,00H
```

```
03AC 00
03AD 00
03AE 16                 DB      16H,00H,00H
03AF 00
03B0 00
03B1 32                 DB      32H,00H,00H
03B2 00
03B3 00
03B4 64                 DB      64H,00H,00H
03B5 00
03B6 00
03B7 28                 DB      28H,01H,00H
03B8 01
03B9 00
03BA 56                 DB      56H,02H,00H
03BB 02
03BC 00
03BD 12                 DB      12H,05H,00H
03BE 05
03BF 00
03C0 24                 DB      24H,10H,00H
03C1 10
03C2 00
03C3 48                 DB      48H,20H,00H
03C4 20
03C5 00
03C6 96                 DB      96H,40H,00H
03C7 40
03C8 00
03C9 92                 DB      92H,81H,00H
03CA 81
03CB 00
03CC 84                 DB      84H,63H,01H
03CD 63
03CE 01
03CF 68                 DB      68H,27H,03H
03D0 27
03D1 03
03D2 36                 DB      36H,55H,06H
03D3 55
03D4 06
03D5 72                 DB      72H,10H,13H
03D6 10
03D7 13
03D8 44                 DB      44H,21H,26H
03D9 21
03DA 26
                ;
                ;
                DISPLAY_CONDITION:
03DB D200               SETB    ZERO_FLAG               ;SET FLAG TO SKIP LEADING ZEROS
03DD E540               MOV     A,DISPLAY_MODE
03DF B40300             CJNE    A,#03H,$+3              ;IF IN MODE 3 OR 4 THEN DISPLAY 3 DIGITS
03E2 4007               JC      DISPLAY_ALL             ;ELSE DISPLAY 6 DIGITS
03E4 755802             MOV     DISPLAY_COUNTER,#02H
03E7 785A               MOV     R0,#BYTE_2
03E9 8103               AJMP    DISPLAY_2

                DISPLAY_ALL:
03EB 755803             MOV     DISPLAY_COUNTER,#03H
03EE 7858               MOV     R0,#BYTE_3

                DISPLAY_1:
03F0 E6                 MOV     A,@R0
03F1 54F0               ANL     A,#0F0H                 ;MASK OFF LOWER NIBBLE
03F3 C4                 SWAP    A
03F4 7003               JNZ     NOT_ZERO_1              ;DO NOT DISPLAY IF ZERO
03F6 200007             JB      ZERO_FLAG,DISPLAY_2_BLANK
                NOT_ZERO_1:
03F9 C200               CLR     ZERO_FLAG
03FB 120428             CALL    SEND_DIGIT
03FE 8103               AJMP    DISPLAY_2
                ;
                DISPLAY_2_BLANK:
0400 120422             CALL    SEND_SPACE
                ;
                DISPLAY_2:
0403 E6                 MOV     A,@R0
0404 540F               ANL     A,#00FH
0406 7003               JNZ     NOT_ZERO_2
0408 200007             JB      ZERO_FLAG,DISPLAY_3_BLANK
                NOT_ZERO_2:
040B C200               CLR     ZERO_FLAG
040D 120428             CALL    SEND_DIGIT
0410 8113               AJMP    DISPLAY_3

                DISPLAY_3_BLANK:
0412 E558               MOV     A,DISPLAY_COUNTER
0414 B40103             CJNE    A,#01H,DO_BLANK         ;IF LAST DIGIT THEN DISPLAY ZERO
0417 E4                 CLR     A
0418 810B               AJMP    NOT_ZERO_2
                DO_BLANK:
041A 120422             CALL    SEND_SPACE
                ;
                DISPLAY_3:
041D 18                 DEC     R0
041E D558CF             DJNZ    DISPLAY_COUNTER,DISPLAY_1
0421 22                 RET
```

```
                        ;
                        SEND_SPACE:
0422 7420                       MOV     A,#020H
0424 120446                     CALL    SEND_DATA
0427 22                         RET
                        ;
                        SEND_DIGIT:
0428 2430                       ADD     A,#030H                 ;CONVERT IT TO ASCII
042A 120446                     CALL    SEND_DATA
042D 22                         RET
                        ;
                        ;
                        EXHAUSTED:
042E 753A10                     MOV     INT_COUNTER,#010H
0431 120437                     CALL    SET_TIMER0
0434 D203                       SETB    ON_FLAG
0436 22                         RET
                        ;
                        SET_TIMER0:
0437 758A00                     MOV     TL0,#00H
043A 758C00                     MOV     TH0,#00H
043D D2A9                       SETB    ET0                     ;ENABLE TIMER0 INTERRUPT
043F D28C                       SETB    TR0
0441 22                         RET
                        ;
                        ;
                        ;***********************************************************************

                        SEND_COMMAND:
0442 D2B7                       SETB    INST_DATA               ;SET LCD TO RECEIVE INSTRUCTION
0444 8002                       SJMP    INST

                        SEND_DATA:
0446 C2B7                       CLR     INST_DATA               ;SET LCD TO RECEIVE DATA

0448 C2B6               INST:   CLR     READ_WRITE              ;SET LCD FOR WRITE
044A F580                       MOV     P0,A                    ;PUT LCD DATA ON BUS
044C D2A5                       SETB    LCD_STROBE
044E 00                         NOP
044F C2A5                       CLR     LCD_STROBE
0451 7580FF                     MOV     P0,#0FFH                ;SET UP PORT 0 FOR INPUT
0454 D2B7                       SETB    INST_DATA               ;SET LCD TO RECEIVE INSTRUCTION
0456 D2B6                       SETB    READ_WRITE              ;SET LCD FOR READ

0458 D2A5               BUSY:   SETB    LCD_STROBE
045A 00                         NOP
045B E580                       MOV     A,P0                    ;READ IN LCD STATUS
045D C2A5                       CLR     LCD_STROBE
045F 20E7F6                     JB      ACC.7,BUSY              ;JUMP IF LCD STILL BUSY
0462 22                         RET

                        CLEAR_LCD:
0463 7401                       MOV     A,#01                   ;CLEAR DISPLAY, RESET CURSER
0465 8142                       AJMP    SEND_COMMAND

                        ;***********************************************************************

                        ;THE WRITE EEPROM ROUTINE IS TIME DEPENDENT AND MUST NOT BE INTERRUPTED
                        ;OR LOSS OF STORED DATA MAY OCCUR.

                        WRITE_EEPROM:
0467 7430                       MOV     A,#30H                  ;SEND PROGRAMMING ENABLE INST.
0469 9188                       ACALL   SEND_EEPROM_INST
046B C2B4                       CLR     EEPROM_SELECT

046D E554                       MOV     A,EEPROM_ADD            ;SEND ERASE REGISTER INSTRUCTION
046F 44C0                       ORL     A,#0C0H
0471 9188                       ACALL   SEND_EEPROM_INST
0473 C2B4                       CLR     EEPROM_SELECT
0475 910F                       ACALL   DELAY_20MSEC            ;ERASE/WRITE PROGRAMMING TIME

0477 E554                       MOV     A,EEPROM_ADD            ;SEND EEPROM WRITE INSTRUCTION
0479 4440                       ORL     A,#40H
047B 9188                       ACALL   SEND_EEPROM_INST

047D E54D                       MOV     A,EEPROM_BUF_1          ;WRITE FIRST 8 BITS INTO EEPROM
047F 91C4                       ACALL   SEND_8

0481 E54E                       MOV     A,EEPROM_BUF_2          ;WRITE SECOND 8 BITS INTO EEPROM
0483 91C4                       ACALL   SEND_8

0485 C2B4                       CLR     EEPROM_SELECT
0487 910F                       ACALL   DELAY_20MSEC            ;ERASE/WRITE PROGRAMMING TIME

0489 E4                         CLR     A                       ;SEND PROGRAMMING DISABLE INST.
048A 9188                       ACALL   SEND_EEPROM_INST
048C C2B4                       CLR     EEPROM_SELECT
048E 22                         RET

                        READ_EEPROM:
048F D2B6                       SETB    FROM_EEPROM             ;SET UP P3.6 FOR INPUT
0491 E554                       MOV     A,EEPROM_ADD            ;SEND EEPROM READ INSTRUCTION
0493 4480                       ORL     A,#80H
0495 9188                       ACALL   SEND_EEPROM_INST

0497 754F02                     MOV     EEPROM_COUNTER_1,#02    ;SET UP EEPROM DATA COUNTERS
049A 755008                     MOV     EEPROM_COUNTER_2,#08
```

```
                    IN_LOOP:
049D 9106                     ACALL   EEPROM_SK                ;READ IN BIT FROM EEPROM
049F 208603                   JB      FROM_EEPROM,ONE_IN       ;JUMP IF A LOGIC 1 IS READ
04A2 C3                       CLR     C
04A3 81A6                     AJMP    ZERO_IN

04A5 D3             ONE_IN: SETB      C

                    ZERO_IN:
04A6 33                       RLC     A                                   ;ROTATE BIT INTO ACC
04A7 D550F3                   DJNZ    EEPROM_COUNTER_2,IN_LOOP            ;CHECK IF 8 BITS READ
04AA 854E40                   MOV     EEPROM_BUF_1,EEPROM_BUF_2           ;MOVE FIRST 8 BITS TO BUF 1
04AD F54E                     MOV     EEPROM_BUF_2,A                      ;MOVE LAST 8 BITS TO BUF 2
04AF 755008                   MOV     EEPROM_COUNTER_2,#08
04B2 D54FE8                   DJNZ    EEPROM_COUNTER_1,IN_LOOP            ;CHECK IF ALL 16 BITS READ
04B5 C2B4                     CLR     EEPROM_SELECT
04B7 22                       RET

                    SEND_EEPROM_INST:
04B8 D2B7                     SETB    TO_EEPROM                ;SET DI LOW FOR ONE SK CYCLE
04BA D2B4                     SETB    EEPROM_SELECT
04BC 9106                     ACALL   EEPROM_SK
04BE C2B7                     CLR     TO_EEPROM                ;SEND START BIT
04C0 9106                     ACALL   EEPROM_SK
04C2 81C4                     AJMP    SEND_8                   ;SEND INSTRUCTION WORD

04C4 754F08         SEND_8: MOV       EEPROM_COUNTER_1,#08

04C7 33             ELOOP:  RLC       A
04C8 5004                   JNC       EZERO                    ;JUMP IF A ZERO BIT
04CA C2B7                   CLR       TO_EEPROM                ;SEND A "1" TO EEPROM
04CC 81D0                   AJMP      EONE

04CE D2B7           EZERO:  SETB      TO_EEPROM

04D0 9106           EONE:   ACALL     EEPROM_SK                ;GO TO NEXT LOCATION
04D2 D54FF2                 DJNZ      EEPROM_COUNTER_1,ELOOP   ;CHECK IF ALL 8 BITS SENT
04D5 22                     RET

                    EEPROM_SK:
04D6 D2B5                     SETB    EEPROM_STROBE            ;SEND 4 USEC SK PULSE
04D8 00                       NOP
04D9 00                       NOP
04DA 00                       NOP
04DB 00                       NOP
04DC C2B5                     CLR     EEPROM_STROBE
04DE 22                       RET

                    DELAY_20MSEC:
04DF 754F28                   MOV     EEPROM_COUNTER_1,#40     ;40 X 512 USEC = 20 MSEC
04E2 755000                   MOV     EEPROM_COUNTER_2,#00     ;SMALL LOOP IS 512 USEC
04E5 D550FD                   DJNZ    EEPROM_COUNTER_2,$
04E8 D54FF7                   DJNZ    EEPROM_COUNTER_1,$-6
04EB 22                       RET


                    ;*************************************************************************
                    ;                                                                        *
                    ;                        INTERRUPT ROUTINES                              *
                    ;                                                                        *
                    ;*************************************************************************
                    ;
                    TIMER0_INT:
04EC C0E0                     PUSH    ACC
04EE C0F0                     PUSH    B
04F0 C0D0                     PUSH    PSW
04F2 C083                     PUSH    DPH
04F4 C082                     PUSH    DPL
                    ;
04F6 C28C                     CLR     TR0
04F8 C2A9                     CLR     ET0
                    ;
04FA 100309                   JBC     ON_FLAG,GO_OFF
                    ;
04FD 740C                     MOV     A,#00CH          ;TURN DISPLAY BACK ON
04FF 9142                     CALL    SEND_COMMAND
0501 753A10                   MOV     INT_COUNTER,#010H
0504 D203                     SETB    ON_FLAG
0506 A10F                     AJMP    TMR0_RET
                    ;
                    GO_OFF:
0508 7408                     MOV     A,#008H          ;TURN DISPLAY OFF
050A 9142                     CALL    SEND_COMMAND
050C 753A05                   MOV     INT_COUNTER,#005H
                    ;
                    TMR0_RET:
050F 9137                     CALL    SET_TIMER0
0511 020594                   JMP     RESTORE
                    ;
                    ;*************************************************************************
                    ;
                    TIMER1_INT:
0514 D5384C                   DJNZ    MSEC,SET_RET
0517 753814                   MOV     MSEC,#020D
                    ;
051A C0E0                     PUSH    ACC
051C C0F0                     PUSH    B
051E C0D0                     PUSH    PSW
```

```
0520 C083           PUSH    DPH
0522 C082           PUSH    DPL
            ;
0524 C28E           CLR     TR1
0526 C2AB           CLR     ET1
            ;
0528 D2AA           SETB    EX1             ;ENABLE POWER DOWN INTERRUPT
052A 1548           DEC     SEC_COUNTER
052C D53C11         DJNZ    SECOND,PHOUR    ;NOT ONE MINUTE YET
052F 753C3C         MOV     SECOND,#0500
            ;
0532 D53D08         DJNZ    MINUTE,PHOUR    ;NOT ONE HOUR YET
0535 753D3C         MOV     MINUTE,#0500
0538 0541           INC     HOUR_1          ;BUMP HOUR COUNTERS
053A E541           MOV     A,HOUR_1
053C 7002           JNZ     PHOUR
053E 0542           INC     HOUR_2
            PHOUR:
0540 300516         JNB     PRINT_FLAG,TMR1_RET
0543 C205           CLR     PRINT_FLAG
0545 D53E11         DJNZ    P_SECOND,TMR1_RET
0548 753E3C         MOV     P_SECOND,#0600
            ;
054B D53F08         DJNZ    P_MINUTE,TMR1_RET
054E 753F3C         MOV     P_MINUTE,#0600
0551 0543           INC     PHOUR_1
0553 E543           MOV     A,PHOUR_1
0555 7002           JNZ     TMR1_RET
0557 0544           INC     PHOUR_2
            ;
            TMR1_RET:
0559 D082           POP     DPL
055B D083           POP     DPH
055D D0D0           POP     PSW
055F D0F0           POP     B
0561 D0E0           POP     ACC
            ;
            SET_RET:
0563 120567         CALL    SET_TIMER1
0566 32             RETI

            ;
            SET_TIMER1:
0567 758BAF         MOV     TL1,#0AFH       ;SET FOR 50 MSEC
056A 758D3C         MOV     TH1,#03CH
            ;
056D D28E           SETB    TR1
056F D2AB           SETB    ET1
0571 22             RET
            ;
            ;*********************************************************************
            ;
            LINE_COUNT:
0572 D205           SETB    PRINT_FLAG
0574 D55C33         DJNZ    LINE_CTR1,LC_RET        ;DO INTERRUPT EVERY 1000 LINES
0577 755CFA         MOV     LINE_CTR1,#0250D
            ;
057A D55D20         DJNZ    LINE_CTR2,LC_RET
057D 755D04         MOV     LINE_CTR2,#004D
            ;
0580 C0E0           PUSH    ACC
0582 C0F0           PUSH    B
0584 C0D0           PUSH    PSW
0586 C083           PUSH    DPH
0588 C082           PUSH    DPL
            ;
058A 0545           INC     LINE_1                  ;INC LINE COUNTER
058C E545           MOV     A,LINE_1
058E 7008           JNZ     NO_INC
0590 0546           INC     LINE_2
0592 E546           MOV     A,LINE_2
0594 7002           JNZ     NO_INC
0596 0547           INC     LINE_3
            ;
            NO_INC:
0598 20040C         JB      PRESET_FLAG,NO_DEC      ;IF PRESET=0 THEN DON'T DEC REMAIN
059B 1549           DEC     REMAIN_1                ;DEC RIBBON COUNTER
059D E549           MOV     A,REMAIN_1
059F 7005           JNZ     NO_DEC
05A1 E54A           MOV     A,REMAIN_2
05A3 6006           JZ      SET_FAULT
05A5 154A           DEC     REMAIN_2
            ;
            NO_DEC:
05A7 0205B4         AJMP    RESTORE
            LC_RET:
05AA 32             RETI
            ;
            SET_FAULT:
05AB C281           CLR     RIBBON_EXH
05AD 754005         MOV     DISPLAY_MODE,#005H      ;DISPLAY 'RIBBON EXHAUSTED'
05B0 515C           CALL    MODE_DISPLAY
05B2 A1B4           AJMP    RESTORE
            ;
            ;
            ;*********************************************************************
            ;
            RESTORE:
```

```
0534 D082             POP    DPL
0596 D083             POP    DPH
0598 D0D0             POP    PSW
059A D0F0             POP    B
059C D0E0             POP    ACC
               ;
059E 32               RETI
               ;
               ;*********************************************************************
               ;
               POWER_DOWN:
053F 7554FF           MOV    EEPROM_ADD,#0FFH
05C2 7941             MOV    R1,#HOUR_1
               ;
               PD_MORE:
05C4 0554             INC    EEPROM_ADD
05C6 8740             MOV    EEPROM_BUF_1,@R1
05C8 09               INC    R1
05C9 874E             MOV    EEPROM_BUF_2,@R1
05CB 9167             CALL   WRITE_EEPROM     INC EEPROM_ADD
               ;
05CD 09               INC    R1
05CE B94DF3           CJNE   R1,#PRESET_2+1,PD_MORE   ;ALL DONE?
               ;
05D1 A1D1             AJMP   $                         ;STAY HERE TIL ETERNITY
               ;
               ;
               ;*********************************************************************
                      END
MCS-51 MACRO ASSEMBLER    LB-SERIES METER PACKAGE PROGRAM
```

XREF SYMBOL TABLE LISTING

| NAME | TYPE | VALUE AND REFERENCES | |
|---|---|---|---|
| ACC . . . . . . . . | N DSEG | 00E0H | 242 720 833 865 903 928 970 |
| ADDITION. . . . . | L CSEG | 0393H | 578 585# |
| ALREADY_ON. . . . | L CSEG | 01C9H | 343 346# |
| B . . . . . . . . . | N DSEG | 00F0H | 418 421 424 429 452 457 505 834 866 902 929 969 |
| BINARY_DECIMAL. . | L CSEG | 0365H | 187 549 552# |
| BUSY. . . . . . . | L CSEG | 0458H | 716# 720 |
| BYTE_1. . . . . . | N | 0059H | 77# 189 193 555 588 |
| BYTE_2. . . . . . | N | 005AH | 78# 195 556 629 |
| BYTE_3. . . . . . | N | 005BH | 79# 557 598 634 |
| CHECK_MORE. . . . | L CSEG | 0378H | 560# 583 599 |
| CHK16 . . . . . . | L CSEG | 0288H | 468 472# |
| CK_PRESET . . . . | L CSEG | 0212H | 158 387 391# |
| CK_RET. . . . . . | L CSEG | 021EH | 394 396 398# |
| CLEAR . . . . . . | L CSEG | 019CH | 278 319# |
| CLEAR_1 . . . . . | L CSEG | 01A4H | 321 325# |
| CLEAR_2 . . . . . | L CSEG | 01B7H | 320 336# |
| CLEAR_LCD . . . . | L CSEG | 0463H | 177 444 723# |
| CLEAR_RET . . . . | L CSEG | 01A2H | 322# 327 334 |
| CLO . . . . . . . | L CSEG | 014EH | 231 267# |
| CLOSE_COUNTER . . | N | 0038H | 42# 220 260 |
| COLUMN_1. . . . . | N | 0030H | 33# 202 235 |
| COLUMN_2. . . . . | N | 0031H | 34# 203 |
| COLUMN_3. . . . . | N | 0032H | 35# 204 |
| COLUMN_4. . . . . | N | 0033H | 36# 205 |
| COLUMN_BUF. . . . | N | 0034H | 38# 250 256 263 270 271 |
| COLUMN_REG. . . . | N | 0036H | 40# 257 263 |
| CONTACT . . . . . | L CSEG | 0137H | 227 255# |
| CONTACT_COUNT . . | N REG | R2 | 20# 226 228 234 252 |
| CONTIN. . . . . . | L CSEG | 0126H | 243# 253 |
| D3_RET. . . . . . | L CSEG | 025BH | 436 439# |
| DECIMAL_BINARY. . | L CSEG | 0236H | 385 415# |
| DECIMAL_TABLE . . | L CSEG | 03A2H | 558 601# |
| DELAY_20MSEC. . . | L CSEG | 040FH | 741 754 818# |
| DIFFER. . . . . . | L CSEG | 0146H | 257 259 263# |
| DISPLAY_1 . . . . | L CSEG | 03F0H | 636# 570 |
| DISPLAY_2 . . . . | L CSEG | 0403H | 630 645 650# |
| DISPLAY_2_BLANK . | L CSEG | 0400H | 641 647# |
| DISPLAY_3 . . . . | L CSEG | 041DH | 658 668# |
| DISPLAY_3_BLANK . | L CSEG | 0412H | 654 660# |
| DISPLAY_ALL . . . | L CSEG | 03EBH | 627 632# |
| DISPLAY_CONDITION | L CSEG | 030BH | 549 623# |
| DISPLAY_COUNTER . | N | 0058H | 76# 628 633 661 670 |
| DISPLAY_MODE. . . | N | 0040H | 51# 207 310 311 313 326 347 358 376 405 446 492 497 504 625 958 |
| DO_BLANK. . . . . | L CSEG | 041AH | 662 665# |
| DPH . . . . . . . | N DSEG | 0083H | 458 459 836 868 900 931 967 |
| DPL . . . . . . . | N DSEG | 0082H | 455 456 837 869 899 932 966 |
| EEPROM_ADD. . . . | N | 0054H | 71# 130 137 143 147 150 737 743 763 977 981 |
| EEPROM_BUF_1. . . | N | 004DH | 64# 132 138 152 747 781 982 |
| EEPROM_BUF_2. . . | N | 004EH | 65# 139 154 750 781 792 984 |
| EEPROM_COUNTER_1. | N | 004FH | 66# 767 784 796 806 819 822 |
| EEPROM_COUNTER_2. | N | 0050H | 67# 758 780 783 820 821 |
| EEPROM_SELECT . . | N | 0084H | 26# 735 740 753 758 785 790 |
| EEPROM_SK . . . . | L CSEG | 0406H | 771 791 793 905 909# |
| EEPROM_STROBE . . | N | 0085H | 27# 810 915 |
| ELOOP . . . . . . | L CSEG | 04C7H | 798# 906 |
| EDNE. . . . . . . | L CSEG | 04D0H | 801 805# |
| ERASE_MORE. . . . | L CSEG | 006FH | 141# 144 |
| ET0 . . . . . . . | N BSEG | 00A9H | 337 693 340 |
| ET1 . . . . . . . | N BSEG | 00ABH | 872 915 |
| EX1 . . . . . . . | N BSEG | 00AAH | 874 |

```
EXHAUSTED . . . . .  L CSEG   042EH   516 684#
EZERO . . . . . . .  L CSEG   04CEH   799 803#
FAULT . . . . . . .  L CSEG   00FEH   216 220#
FROM_EEPROM . . . .  N        0086H   28# 762 772
GO_DISPLAY. . . . .  L CSEG   0365H   522 528 534 540 547#
GO_OFF. . . . . . .  L CSEG   0508H   842 850#
GOOD_FLAG . . . . .  N        0001H   87# 222 229 261
HI_BYTE . . . . . .  N        0053H   70# 185 521 527 533 539 545 566 568
HIME. . . . . . . .  L CSEG   030FH   498 501#
HOUR. . . . . . . .  L CSEG   0330H   511 518#
HOUR_1. . . . . . .  N        0041H   52# 149 519 881 882 978
HOUR_2. . . . . . .  N        0042H   53# 520 894
HUNDRED . . . . . .  L CSEG   0106H   281 354#
HUNDRED_BUF . . . .  N        0055H   73# 200 361 362 364 417
I_RET . . . . . . .  L CSEG   0023H   107 117#
IE. . . . . . . . .  N DSEG   00A8H   172
IN_LOOP . . . . . .  L CSEG   049DH   770# 780 784
INC_MODE. . . . . .  L CSEG   0191H   211 304 309#
INC_RET . . . . . .  L CSEG   0199H   312 315#
INIT. . . . . . . .  L CSEG   0050H   101 124#
INIT2 . . . . . . .  L CSEG   00F7H   215# 228 229 276 279 280 282 283 284 286 287 288 290 291 301 323 351 373 389
INST. . . . . . . .  L CSEG   0448H   702 707#
INST_DATA . . . . .  N        0087H   31# 701 705 713
INT_COUNTER . . . .  N        003AH   44# 107 685 846 953
IP. . . . . . . . .  N DSEG   00B8H   171
IT0 . . . . . . . .  N BSEG   0088H   169
IT1 . . . . . . . .  N BSEG   008AH   170
KEY . . . . . . . .  L CSEG   0106H   225# 230 260 265
KEYIN . . . . . . .  L CSEG   0130H   242 250#
LC_RET. . . . . . .  L CSEG   05AAH   922 925 953#
LCD_STROBE. . . . .  N        00A5H   23# 709 711 716 719
LINE. . . . . . . .  L CSEG   0346H   513 530#
LINE_1. . . . . . .  N        0045H   56# 531 934 935
LINE_2. . . . . . .  N        0046H   57# 532 937 938
LINE_3. . . . . . .  N        0047H   58# 533 940
LINE_COUNT. . . . .  L CSEG   0572H   104 920#
LINE_CTR1 . . . . .  N        005CH   80# 166 922 923
LINE_CTR2 . . . . .  N        005DH   81# 167 925 926
LO_BYTE . . . . . .  N        0051H   68# 183 519 525 531 537 543 574 576
MESSAGE . . . . . .  L CSEG   028DH   454 475#
MID_BYTE. . . . . .  N        0052H   69# 184 520 526 532 538 544 570 572
MINUTE. . . . . . .  N        0030H   47# 161 879 880
MODE. . . . . . . .  L CSEG   017CH   217 295#
MODE_1. . . . . . .  L CSEG   0189H   297 303#
MODE_DISPLAY. . . .  L CSEG   025CH   212 305 348 443# 359
MODE_FLAG . . . . .  N        0002H   88# 210 297 298 321 356 371 404
MODE_RET. . . . . .  L CSEG   0184H   296 299# 306
MODE_TABLE. . . . .  L CSEG   031EH   507 510#
MORE. . . . . . . .  L CSEG   0079H   149# 156
MSEC. . . . . . . .  N        003BH   45# 160 862 863
NEXT_CHAR . . . . .  L CSEG   027CH   462# 472
NEXT_MODE . . . . .  L CSEG   00ECH   209# 218
NEXT_VALUE. . . . .  L CSEG   0396H   590# 598
NO_DEC. . . . . . .  L CSEG   05A7H   943 946 951#
NO_INC. . . . . . .  L CSEG   0598H   936 939 942#
NOT_2 . . . . . . .  L CSEG   0269H   447 448 451#
NOT_COLD. . . . . .  L CSEG   0076H   133 146#
NOT_ZERO_1. . . . .  L CSEG   03F9H   640 642#
NOT_ZERO_2. . . . .  L CSEG   0408H   633 655# 664
NXTCOL. . . . . . .  L CSEG   011CH   237# 247
NXTROW. . . . . . .  L CSEG   0123H   242# 245
ON_FLAG . . . . . .  N        0003H   89# 343 687 842 847
ONE . . . . . . . .  L CSEG   021FH   289 402#
ONE_BUF . . . . . .  N        0057H   75# 191 409 410 412 435
ONE_IN. . . . . . .  L CSEG   04A5H   772 776#
OPEN_COUNTER. . . .  N        0039H   43# 221 230
P_MINUTE. . . . . .  N        003FH   49# 163 891 892
P_SECOND. . . . . .  N        003EH   48# 164 888 889
P0. . . . . . . . .  N DSEG   0080H   709 712 718
P1. . . . . . . . .  N DSEG   0090H   238 240
P2. . . . . . . . .  N DSEG   00A0H   125
P3. . . . . . . . .  N DSEG   00B0H   126
PD_MORE . . . . . .  L CSEG   05C4H   980# 988
PHOUR . . . . . . .  L CSEG   0540H   876 879 883 895#
PHOUR_1 . . . . . .  N        0043H   54# 525 893 894
PHOUR_2 . . . . . .  N        0044H   55# 526 896
POWER_DOWN. . . . .  L CSEG   058FH   111 976#
PRESET. . . . . . .  L CSEG   035CH   515 542#
PRESET_1. . . . . .  N        004BH   62# 183 329 340 393 420 426 427 433 435 543
PRESET_2. . . . . .  N        004CH   63# 156 194 330 341 395 421 430 431 437 544 988
PRESET_FLAG . . . .  N        0004H   90# 392 397 448 494 943
PRHOUR. . . . . . .  L CSEG   0338H   512 524#
PRINT_FLAG. . . . .  N        0005H   91# 885 887 921
PSW . . . . . . . .  N DSEG   00D0H   835 867 901 930 968
READ_EEPROM . . . .  L CSEG   048FH   131 151 761#
READ_WRITE. . . . .  N        0096H   29# 707 714
REMAIN. . . . . . .  L CSEG   0351H   514 536#
REMAIN_1. . . . . .  N        0049H   60# 329 340 537 944 945
REMAIN_2. . . . . .  N        004AH   61# 330 341 538 947 949
RESTORE . . . . . .  L CSEG   05B4H   857 952 960 965#
RIBBON_EXH. . . . .  N        0081H   25# 216 296 320 349 355 370 403 957
ROW_BUF . . . . . .  N        0035H   39# 251 258 264
ROW_REG . . . . . .  N        0037H   41# 259 264 267
SC_1. . . . . . . .  L CSEG   0306H   493 494 496#
SCANKEY . . . . . .  L CSEG   0118H   225 233#
SEC_COUNTER . . . .  N        0048H   59# 213 217 300 333 350 388 875
SECOND. . . . . . .  N        003CH   46# 162 876 877
SEND_8. . . . . . .  L CSEG   04C4H   748 751 794 796#
SEND_COMMAND. . . .  L CSEG   0442H   179 191 345 470 502 700# 725 945 852
SEND_CONDITION. . .  L CSEG   02F0H   332 386 473 491#
SEND_DATA . . . . .  L CSEG   0446H   466 675 680 704#
```

```
SEND_DIGIT. . . .  L CSEG   0428H  644 657 678#
SEND_EEPROM_INST.  L CSEG   04B8H  734 739 745 757 765 788#
SEND_SPACE. . . .  L CSEG   0422H  648 666 673#
SET_FAULT . . . .  L CSEG   05A8H  948 956#
SET_RET . . . . .  L CSEG   0563H  862 905#
SET_TIMER0. . . .  L CSEG   0437H  686 690# 856
SET_TIMER1. . . .  L CSEG   0567H  175 906 910#
SHIFT_COUNTER . .  N        005EH  82# 553 561
SHIFT_MORE. . . .  L CSEG   037CH  561 564#
SP. . . . . . . .  N DSEG   0081H  124
TABLE . . . . . .  L CSEG   015CH  273 276#
TEMP. . . . . . .  N REG    R3     21# 460 463 467 468 472
TEN . . . . . . .  L CSEG   01EDH  285 369#
TEN_1 . . . . . .  L CSEG   0204H  363 366 381 384# 411 413
TEN_2 . . . . . .  L CSEG   01F5H  371 375#
TEN_BUF . . . . .  N        0056H  74# 196 379 380 382 423
TEN_RET . . . . .  L CSEG   01F3H  355 356 359 370 372# 377 403 404 407
TH0 . . . . . . .  N DSEG   008CH  692
TH1 . . . . . . .  N DSEG   003DH  912
TIMER0_INT. . . .  L CSEG   04ECH  108 832#
TIMER1_INT. . . .  L CSEG   0514H  114 861#
TL0 . . . . . . .  N DSEG   008AH  691
TL1 . . . . . . .  N DSEG   008BH  911
TMOD. . . . . . .  N DSEG   0089H  173
TMR0_RET. . . . .  L CSEG   050FH  848 855#
TMR1_RET. . . . .  L CSEG   0559H  886 888 891 995 898#
TO_EEPROM . . . .  N        0087H  30# 789 792 800 803
TR0 . . . . . . .  N BSEG   009CH  338 694 839
TR1 . . . . . . .  N BSEG   009EH  971 914
WRITE_EEPROM. . .  L CSEG   0467H  142 732# 985
ZERO_FLAG . . . .  N        0000H  96# 624 641 643 654 656
ZERO_IN . . . . .  L CSEG   04A6H  774 778#

ASSEMBLY COMPLETE, NO ERRORS FOUND
```

What is claimed is:

1. A meter, for use with an electrical printer that produces both a POWER ON signal which indicates when active that a printer operating voltage is on and a LINE PRINTED signal which indicates when active that a line is printed, comprising:

(a) POWER ON and LINE PRINTED sensing inputs for respectively receiving the POWER ON and LINE PRINTED signals from a printer;

(b) display means having a display input, for converting signals received at the display input into a corresponding meter display; and (c) microprocessor means (i) having clock means for generating timing pulses, ROM and RAM memories, a program stored in the ROM memory, and HOURS ON and KILOLINES PRINTED variables stored in the RAM memory, and (ii) coupled to the sensing inputs to receive the POWER ON and LINE PRINTED signals and coupled for transmission to the display input;

the microprocessor means by executing the program being responsive to (i) the POWER ON signal and the timing pulses for incrementing the HOURS ON variable for each hour the printer operating voltage is on; (ii) the LINE PRINTED signal for incrementing the KILOLINES PRINTED variable for each 1000 times a line is printed; and (iii) the currently stored HOURS ON and KILOLINES PRINTED variables for transmitting their values to the display input for conversion by the display means to corresponding meter displays of HOURS ON and KILOLINES PRINTED.

2. The meter of claim 1 wherein the microprocessor means and its clock means, ROM memory, and RAM memory are included on a single microprocessor chip.

3. The meter of claim 1 for use with an electrical printer that further produces a POWER GOING DOWN signal that is active shortly before the printer's POWER ON signal goes inactive, said meter further comprising a POWER GOING DOWN sensing input for receiving the POWER GOING DOWN signal from the printer, and nonvolatile memory means; the microprocessor means also being coupled to the nonvolatile memory means for writing and reading data and coupled to the POWER GOING DOWN input to receive the POWER GOING DOWN signal, and being responsive to the POWER GOING DOWN signal becoming active for reading the HOURS ON and KILOLINES PRINTED variables from the RAM memory and writing them in the nonvolatile memory means.

4. The meter of claim 3 wherein the nonvolatile memory means is an EEPROM.

5. The meter of claim 3 wherein the microprocessor means includes reset means responsive to the POWER ON signal returning from inactive to active for resetting the microprocessor to resume execution of the program by initially reading the HOURS ON and KILOLINES PRINTED variables from the nonvolatile memory means and rewriting them in the RAM memory, whereby the HOURS ON and KILOLINES PRINTED variables are cumulative for successive periods when the printer power is on, even through such power on periods are separated by periods when the printer power is off.

6. The meter of claim 1 wherein the corresponding meter displays created by the display means automatically alternate between displaying an HOURS ON message and a KILOLINES PRINTED message.

7. The meter of claim 1 for use with a printer that uses a ribbon having a preselected ribbon life in kilolines, said meter further comprising a RIBBON KILOLINES REMAINING variable stored in the RAM memory, and wherein the microprocessor means by executing the program initializes the RIBBON KILOLINES REMAINING variable to a preselected number of kilolines of ribbon life and is responsive to the LINE PRINTED signal for decrementing the RIBBON KILOLINES REMAINING variable each time the LINE PRINTED signal becomes active, and is responsive to the currently stored RIBBON KILOLINES REMAINING variable for transmitting its value to the display input for conversion by the display means to a corresponding meter display of RIBBON KILOLINES REMAINING.

8. The meter of claim 7 wherein the corresponding meter displays created by the display means automatically alternate between displaying an HOURS ON message, a KILOLINES PRINTED message, and a RIBBON KILOLINES REMAINING message.

9. The meter of claim 7 further comprising keypad means for converting keys pressed for entry by the user into corresponding user data signals indicating a RIBBON PRESET number in kilolines so entered, and the microprocessor means being coupled to the keypad means for receiving the data signals, determining from them the RIBBON PRESET number, and initializing the RIBBON KILOLINES REMAINING variable to the RIBBON PRESET number.

10. The meter of claim 7 for use with an electrical printer that further produces a POWER GOING DOWN signal that is active shortly before the printer's POWER ON signal goes inactive, said meter further comprising a POWER GOING DOWN sensing input for receiving the POWER GOING DOWN signal from the printer, and nonvolatile memory means; the microprocessor means also being coupled to the nonvolatile memory means for writing and reading data and coupled to the POWER GOING DOWN input to receive the POWER GOING DOWN signal, and being responsive to the POWER GOING DOWN signal becoming active (dropping LOW) for reading the HOURS ON, KILOLINES PRINTED, and RIBBON KILOLINES REMAINING variables from the RAM memory and writing them in the nonvolatile memory means.

11. The meter of claim 10 wherein the microprocessor means includes reset means responsive to the POWER ON signal returning from inactive to active for resetting the microprocessor to resume execution of the program by initially reading the HOURS ON, KILOLINES PRINTED, and RIBBON KILOLINES REMAINING variables from the nonvolatile memory means and rewriting them in the RAM memory, whereby the HOURS ON and KILOLINES PRINTED variables are cumulative, and the RIBBON KILOLINES REMAINING variable is successively decremented, for successive periods when the printer power is on, even through such power on periods are separated by periods when the printer power is off.

12. A meter, for use with an electrical printer that produces both a POWER ON signal which indicates when active that a printer operating voltage is on a LINE PRINTED signal which indicates when active that a line is printed, said meter comprising:

(a) POWER ON and LINE PRINTED sensing inputs for respectively receiving the POWER ON and LINE PRINTED signals from a printer;

(b) display means having a display input, for converting signals received at the display input into a corresponding meter display; and (c) microprocessor means (i) having clock means for generating timing pulses, ROM and RAM memories, a program stored in the ROM memory, and a PRINT HOURS variables stored in the RAM memory, and (ii) coupled to the sensing inputs to receive the POWER ON and LINE PRINTED signals and coupled for transmission to the display input;

the microprocessor means by executing the program being responsive to (i) the LINE PRINTED signal for setting a PRINT FLAG each time a line is printed, (ii) the POWER ON signal, the timing pulses, and the PRINT FLAG for clearing the PRINT FLAG once each second if it is set and for incrementing the PRINT HOURS variable for each net hour the printer operating voltage is on after excluding any periods during which the PRINT FLAG remains cleared which are longer than a preselected short interval, and (iii) the currently stored PRINT HOURS variable for transmitting its value to the display input for conversion by the display means to a corresponding meter display of PRINT HOURS.

13. The meter of claim 12 wherein the preselected short interval is about a second.

14. The meter of claim 12 wherein the microprocessor means and its clock means, ROM memory, and RAM memory are included on a single microprocessor chip.

15. The meter of claim 12 for use with an electrical printer that further produces a POWER GOING DOWN signal that is active shortly before the printer's POWER ON signal goes inactive, said meter further comprising a POWER GOING DOWN sensing input for receiving the POWER GOING DOWN signal from the printer, and nonvolatile memory means; the microprocessor means also being coupled to the nonvolatile memory means for writing and reading data and coupled to the POWER GOING DOWN input to receive the POWER GOING DOWN signal, and being responsive to the POWER GOING DOWN signal becoming active for reading the PRINT HOURS variable from the RAM memory and writing it in the nonvolatile memory means.

16. The meter of claim 15 wherein the nonvolatile memory means is an EEPROM.

17. The meter of claim 15 wherein the microprocessor means includes reset means responsive to the POWER ON signal returning from inactive to active for resetting the microprocessor to resume execution of the program by initially reading the PRINT HOURS variable from the nonvolatile memory means and rewriting it in the RAM memory, whereby the PRINT HOURS variable is cumulative for successive periods when the printer power is on, even though such power on periods are separated by periods when the printer power is off.

18. The meter of claim 12 wherein the microprocessor means further has an HOURS ON variable stored in the RAM memory, is responsive to the POWER ON signal and the timing pulses for incrementing the HOURS ON variable for each hour the printer operating voltage is on, and is responsive to the currently stored HOURS ON variable for transmitting its value to the display input for conversion by the display to a corresponding meter display of HOURS ON.

19. The meter of claim 18 wherein the corresponding meter displays created by the display means automatically alternate between displaying a PRINT HOURS message and an HOURS ON message.

20. The meter of claim 18 for use with an electrical printer that further produces a POWER GOING DOWN signal that is active shortly before the printer's POWER ON signal goes inactive, said meter further comprising a POWER GOING DOWN sensing input for receiving the POWER GOING DOWN signal from the printer, and nonvolatile memory means; the microprocessor means also being coupled to the nonvolatile memory means for writing and reading data and coupled to the POWER GOING DOWN input to receive the POWER GOING DOWN signal, and being responsive to the POWER GOING DOWN signal becoming active for reading the PRINT HOURS and HOURS ON variables from the RAM memory and writing them in the nonvolatile memory means.

21. The meter of claim 20 wherein in the nonvolatile memory means is an EEPROM.

22. The meter of claim 20 wherein the microprocessor means includes reset means responsive to the POWER ON signal returning from inactive to active for resetting the microprocessor to resume execution of th- program by initially reading the PRINT HOURS and HOURS ON variables from the nonvolatile memory means and rewriting them in the RAM memory, whereby the PRINT HOURS and HOURS ON variables are each cumulative for successive periods when the printer power is on, even through such power on periods are separated by periods when the printer power is off.

23. The meter of claim 12 for use with a printer that uses a ribbon having a preselected ribbon life in kilolines, said meter further comprising a RIBBON KILOLINES REMAINING variable stored in the RAM memory, and wherein the microprocessor means by executing the program initializes the RIBBON KILOLINES REMAINING variable to a preselected number of lines of ribbon life and is responsive to the LINE PRINTED signal for decrementing the RIBBON KILOLINES REMAINING variable each time a line is printed and is responsive to the currently stored RIBBON KILOLINES REMAINING variable for transmitting its value to the display input for conversion by the display means to a corresponding meter display of RIBBON KILOLINES REMAINING.

24. The meter of claim 23 wherein the corresponding meter displays created by the display means automatically alternate between displaying a PRINTER HOURS message and an HOURS ON message.

25. The meter of claim 23 further comprising keypad means for converting keys pressing for entry by the user into corresponding user data signals indicating a RIBBON PRESET number in kilolines so entered, and the microprocessor means being coupled to the keypad means for receiving the data signals, determining from them the RIBBON PRESET number, and initializing the RIBBON KILOLINES REMAINING variable to the RIBBON PRESET number.

26. The meter of claim 12 wherein the microprocessor means further has a KILOLINES PRINTED variable stored in the RAM memory, is responsive to the LINE PRINTED signal for incrementing the KILOLINES PRINTED variable for each 1000 times a line is printed, and is responsive to the currently stored KILOLINES PRINTED variable for transmitting its value to the display input for conversion by the display to a corresponding meter display of KILOLINES PRINTED.

27. The meter of claim 26 wherein the corresponding meter display's created by the display means automatically alternate between displaying a PRINT HOURS message and a KILOLINES PRINTED message.

28. The meter of claim 27 for use with an electrical printer that further produces a POWER GOING DOWN signal that is active shorter before the printer's POWER ON signal goes inactive, said meter further comprising a POWER GOING DOWN sensing input for receiving the POWER GOING DOWN signal from the printer, and nonvolatile memory means; the microprocessor means also being coupled to the nonvolatile memory means for writing and reading data and coupled to the POWER GOING DOWN input to receive the POWER GOING DOWN signal, and being responsive to the POWER GOING DOWN signal becoming active for reading the PRINT HOURS and KILOLINES PRINTED variables-s from the RAM memory and writing them in the nonvolatile memory means.

29. The meter of claim 28 wherein in the nonvolatile memory means is an EEPROM.

30. The meter of claim 28 wherein the microprocessor means includes reset means responsive to the POWER ON signal returning from inactive to active for resetting the microprocessor to resume execution of the program by initially reading the PRINT HOURS and KILOLINES PRINTED variables from the nonvolatile memory means and rewriting them in the RAM memory, whereby the PRINT HOURS and KILOLINES PRINTED variables are each cumulative for successive periods when the printer power is on, even though such power on periods are separated by periods when the printer power is off.

* * * * *